US012335489B2

(12) United States Patent
Filippov et al.

(10) Patent No.: US 12,335,489 B2
(45) Date of Patent: Jun. 17, 2025

(54) METHOD AND APPARATUS OF SIMPLIFIED GEOMETRIC MERGE MODE FOR INTER PREDICTION

(71) Applicant: Huawei Technologies Co., Ltd., Guangdong (CN)

(72) Inventors: Alexey Konstantinovich Filippov, Moscow (RU); Vasily Alexeevich Rufitskiy, Moscow (RU); Semih Esenlik, Munich (DE); Han Gao, Shenzhen (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 17/703,006

(22) Filed: Mar. 24, 2022

(65) Prior Publication Data

US 2022/0232226 A1    Jul. 21, 2022

Related U.S. Application Data

(63) Continuation of application No. PCT/RU2020/050247, filed on Sep. 25, 2020.

(30) Foreign Application Priority Data

Sep. 25, 2019 (WO) ................ PCT/RU2019/000674

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/119* (2014.11); *H04N 19/176* (2014.11); *H04N 19/503* (2014.11)

(58) Field of Classification Search
CPC .. H04N 19/159; H04N 19/119; H04N 19/176; H04N 19/503
(Continued)

(56) References Cited

U.S. PATENT DOCUMENTS 11,233,996 B2 * 1/2022 Nam ...................... H04N 19/51
2013/0272418 A1 10/2013 Jeon et al.
(Continued)

FOREIGN PATENT DOCUMENTS

EP       4029249 A2    7/2022
WO    2019039322 A1    2/2019
(Continued)

OTHER PUBLICATIONS

Document: JVET-L1001-v2, Benjamin Bross et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, 168 pages.
(Continued)

*Primary Examiner* — Sath V Perungavoor
*Assistant Examiner* — Kristin Dobbs
(74) *Attorney, Agent, or Firm* — WOMBLE BOND DICKINSON (US) LLP

(57) ABSTRACT

A method includes: obtaining one or more parameters of a geometric merge (GEO) inter prediction mode for a current coding block; defining a size of a subblock that is smaller than a size of the current coding block; specifying a position of the subblock within the current coding block, so that either two or three sides of the subblock coincide with sides of the current coding block; determining one or more allowed split directions of a triangle partitioning mode (TPM) for the subblock depending on which of the sides of the subblock coincide with the sides of the current coding block; and obtaining one or more predicted samples for the
(Continued)

current coding block by using the TPM partitioning performed for the subblock in accordance with the size of the subblock, the position of the subblock within the current coding block and a TPM split direction of the subblock.

20 Claims, 27 Drawing Sheets

(51) Int. Cl.
    *H04N 19/176*    (2014.01)
    *H04N 19/503*    (2014.01)

(58) Field of Classification Search
    USPC .................................................. 375/240.12
    See application file for complete search history.

(56) References Cited

U.S. PATENT DOCUMENTS

| | | |
|---|---|---|
| 2014/0286428 A1 | 9/2014 | Lee et al. |
| 2016/0309169 A1 | 10/2016 | Winken et al. |
| 2016/0373780 A1 | 12/2016 | Hsu et al. |
| 2022/0210460 A1* | 6/2022 | Deng .................. H04N 19/132 |

FOREIGN PATENT DOCUMENTS

| | | |
|---|---|---|
| WO | 2019083334 A1 | 5/2019 |
| WO | 2019164031 A1 | 8/2019 |

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, 836 pages.

ITU-T H.265(Jun. 2019), Series H: Audiovisual and Multimedia Systems, Infrastructure of audiovisual services—Coding of moving video, High efficiency video coding, 696 pages.

Liang Zhao et al., "CE3-related: Unification of angular intra prediction for square and non-square blocks", Document: JVET-L0279, total:Joint Video ExPerts Team(JVET) of ITU TSG16WP3andISOIIECJTCI/S C29IWGII 12th Meeting: Macao CN 3 Oct. 12, 2018, total: 10pages.

Han Cao et al., "CE4: CE4-1.1, CE4-1.2 and CE4-1.14: Geometric Merge Mode (GEO)",Document: JVET-P0068-v1, Joint Video Experts Team (JVET) of ITU-T SG 16 WP 3 and ISO/IEC JTC 1/SC 29/WG 11, 16th Meeting: Geneva, CH, 1 Oct. 11, 2019, total:6pages.

* cited by examiner

| whRatio | alphaN | stepD |
|---|---|---|
| 3 | 0 | 0 |
| 3 | 1 | 158 |
| 3 | 2 | 306 |
| 3 | 3 | 438 |
| 3 | 4 | 549 |
| 3 | 5 | 636 |
| 3 | 6 | 694 |
| 3 | 7 | 721 |
| 3 | 8 | 717 |
| 4 | 0 | 0 |
| 4 | 1 | 318 |
| 4 | 2 | 619 |
| 4 | 3 | 893 |
| 4 | 4 | 1129 |
| 4 | 5 | 1317 |
| 4 | 6 | 1450 |
| 4 | 7 | 1524 |
| 4 | 8 | 1536 |

| whRatio | alphaN | stepD |
|---|---|---|
| 0 | 0 | 0 |
| 0 | 1 | 18 |
| 0 | 2 | 31 |
| 0 | 3 | 40 |
| 0 | 4 | 42 |
| 0 | 5 | 40 |
| 0 | 6 | 31 |
| 0 | 7 | 18 |
| 0 | 8 | 0 |
| 1 | 0 | 0 |
| 1 | 1 | 38 |
| 1 | 2 | 71 |
| 1 | 3 | 97 |
| 1 | 4 | 115 |
| 1 | 5 | 125 |
| 1 | 6 | 126 |
| 1 | 7 | 118 |
| 1 | 8 | 102 |
| 2 | 0 | 0 |
| 2 | 1 | 78 |
| 2 | 2 | 149 |
| 2 | 3 | 210 |
| 2 | 4 | 260 |
| 2 | 5 | 295 |
| 2 | 6 | 315 |
| 2 | 7 | 319 |
| 2 | 8 | 307 |

FIG. 13

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| f[idx] | 64 | 63 | 59 | 53 | 45 | 36 | 24 | 12 | 0 | -12 | -24 | -36 | -45 | -53 | -59 | -63 |
| idx | 16 | 17 | 18 | 19 | 20 | 21 | 22 | 23 | 24 | 25 | 26 | 27 | 28 | 29 | 30 | 31 |
| f[idx] | -64 | -63 | -59 | -53 | -45 | -36 | -24 | -12 | 0 | 12 | 24 | 36 | 45 | 53 | 59 | 63 |

FIG. 14

METHOD AND APPARATUS OF SIMPLIFIED GEOMETRIC MERGE MODE FOR INTER PREDICTION

CROSS-REFERENCE TO RELATED APPLICATIONS

This application is a continuation of International Application No. PCT/RU2020/050247, filed on Sep. 25, 2020, which claims priority to International Patent Application No. PCT/RU2019/000674, filed on Sep. 25, 2019. The disclosures of the aforementioned applications are hereby incorporated by reference in their entireties.

TECHNICAL FIELD

Embodiments of the present application (disclosure) generally relate to the field of picture processing and more particularly to inter prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to one embodiment, a method of processing a block is disclosed.

According to further embodiments, an encoder comprising processing circuitry for carrying out the method embodiments.

According to one embodiment, a decoder comprising processing circuitry for carrying out the method embodiments.

According to further embodiments, a computer program product comprising a program code for performing the method embodiments.

According to still further embodiments, a decoder, comprising:
one or more processors; and
a non-transitory computer-readable storage medium coupled to the processors and storing programming for execution by the processors, wherein the programming, when executed by the processors, configures the decoder to carry out the method embodiments.

According to a further embodiment, an encoder, comprising:
one or more processors; and
a non-transitory computer-readable storage medium coupled to the processors and storing programming for execution by the processors, wherein the programming, when executed by the processors, configures the encoder to carry out the method embodiments.

Details of one or more embodiments are set forth in the accompanying drawings and the description below. Other features, objects, and advantages will be apparent from the description, drawings, and claims.

In one embodiment, a computer-implemented method of inter-prediction for a current block of a video sequence for video coding is provided, the method comprising:
obtain one or more parameters of a geometric merge (GEO) inter prediction mode for a current coding block
define a size of a subblock that is smaller than the size of the current coding block
specify a position of the subblock within the current coding block, so that either two or three sides of the subblock coincide with the sides of the current coding block
determine one or more allowed split directions of a triangle partitioning mode (TPM) for the subblock depending on which of the sides of the subblock coincide with the sides of the current coding block
obtain one or more predicted samples for the current coding block by using the TPM partitioning performed for the subblock in accordance with the size of the subblock, the position of the subblock within the current coding block and the TPM split direction of the subblock.

With this, prediction of the block is simplified by applying TPM to regions (subblocks) that qualify for treatment by TPM. Portions of the current coding block (also referred to as current block) can be set to a constant value, making their prediction even less resource consuming and allowing for reduced amount of data for the encoding. This reduces the amount of data that needs to be processed during encoding and decoding.

In one embodiment, the process of obtaining predicted samples further comprises:
setting the weights at positions of samples belonging to the subblock area equal to the corresponding weight of the TPM partitioning specified for the subblock; and
the weights at positions of samples that do not belong to the subblock area equal to a constant value V. Prediction of regions in the block that do only slightly change compared to the reference images can thereby be processed more efficiently. Further, these constant values can be encoded in the datastream requiring only a reduced amount of bits. Thereby, the size of the encoded datastream is reduced.

More specifically, the constant value V may depend on the coinciding sides of the current coding block and the subblock and the subblock split direction. Changes in the to be predicted block (i.e. the current block) compared to the reference blocks can thereby be taken into account.

In one embodiment, after determining allowed split directions and before obtaining predicted samples, the method further comprises selecting one of the allowed split directions as split direction for obtaining the predicted samples. This selection can be made based on further evaluation of characteristics of the reference blocks used for the prediction.

More specifically, the selecting may comprise determining whether there is more than one allowed split direction and, if there is more than one allowed split direction, selecting one of the allowed split directions for obtaining the predicted samples. This allows for neglecting one of the allowed split directions and taking the other allowed split direction. By not having to provide information on the split direction to choose in the datastream, the size of the datastream can be reduced further.

In a further embodiment, the one or more parameters of the GEO inter prediction mode comprise at least one of: an angle parameter, a width W and/or a height H of the current block, a sample distance value that is determined using an aspect ratio, nCbR. These values characterize the prediction for the whole block in order to apply GEO. These parameters can be used efficiently in prediction of the values of the subblock without having to provide additional information. For example, an aspect ratio determined for GEO or provided for GEO in the set of parameters may as well be usable in TPM. Thereby, provision of potentially redundant information for the subblock in the datastream can be avoided.

In a further embodiment, the aspect ratio is determined from the dimensions of the current block by $$nCbR = \frac{W}{H}.$$

As the subblock is arranged within the current block so that at least two sides of the subblock and the current block coincide and because the subblock allows for TPM application in the prediction, the aspect ratio of the current block can also be used for the prediction in the subblock, making redundant information for the subblock to be stored in the datastream no longer necessary. Thereby, the size of the datastream can be reduced.

It may also be provided that the aspect ratio is determined from dimensions of the subblock, $$nCbR = \frac{nCbH}{nCbW},$$

wherein nCbH is a height of the subblock and nCbW is a width of the subblock. By having determined the size of the subblock, an aspect ratio for the further prediction of the subblock can be obtained from the size of the subblock in two dimensions. Thereby, the aspect ratio does not need to be provided as further information in the datastream. This reduces the size of the datastream even further.

In one embodiment, the height of the subblock may be nCbH=$2^p$ pixels and the width of the subblock may be nCbW=$2^q$ pixels, with $q,p \in \mathbb{N}$. Thereby, the aspect ratio of the subblock will only depend on values to the basis of 2 and the power of $\pm(p-q)$, depending on the arrangement of the allowed split direction for the subblock. This simplifies calculations and allows for providing the thus discretized values in an look-up table (LUT). Which can be accessed for the respective values of the aspect ratio easier.

In a further embodiment, two opposite sides of the subblock coincide with two opposite sides of the current block. In that case, two allowed split directions will result and the subblock will not be provided in the edge of the current block.

More specifically, the length of the opposite sides of the subblock may be shorter than the length of the two opposite sides of the current block. In that case, the subblock covers a real subset of the current block, making application of TPM instead of GEO reasonable for the subblock. The bigger the area is that is covered by the subblock, the less effort is necessary for predicting the remainder of the current block using GEO. This simplifies the prediction.

In another embodiment, two adjacent sides of the subblock coincide with two adjacent sides of the current block. In that case, the subblock extends over an edge of the current block. By only having to predict the values of the current block that are in the edge, the computational effort and also the amount of data that needs to be provided for the prediction can be further reduced.

It may also be provided that the length of at least one of the two adjacent sides of the subblock is shorter than then length of the corresponding side of the current block. Thereby, the current block is separated into a part that is predicted using TPM and the remainder of the subblock can, if the values in this remainder remain constant, be predicted with reduced computational effort.

In one embodiment, a center of the subblock coincides with a center of the current block or wherein the center of the subblock does not coincide with the center of the current block.

In one embodiment, a coding system for performing a method of an inter prediction process is provided, the coding system comprising a processing unit configured for performing a method of an inter prediction process according to any of the above embodiments. This implements the above embodiments for example for encoding or decoding datastreams using the inter prediction process.

In a more specific embodiment, the coding system is or comprises a video coding device. Thereby, the advantages of the method according to the above embodiments can be realized for video coding, like decoding and encoding of video sequences.

It may be provided that the coding system is or comprises a decoder or an encoder.

In one embodiment, an encoder for encoding a video sequence using a method of an inter prediction process is provided, the encoder comprising:
  a deriving unit;
  a prediction unit;
  an encoding unit;
  wherein the deriving unit is adapted to:
  obtain one or more parameters of a geometric merge, GEO, inter prediction mode for a current coding block of the video sequence
  wherein the prediction unit is adapted to:
    define a size of a subblock that is smaller than the size of the current coding block
    specify a position of the subblock within the current coding block, so that either two or three sides of the subblock coincide with the sides of the current coding block
    determine one or more allowed split directions of a triangle partitioning mode, TPM, for the subblock depending on which of the sides of the subblock coincide with the sides of the current coding block obtain one or more predicted samples for the current coding block by using the TPM partitioning performed for the subblock in accordance with the size of the subblock, the position of the subblock within the current coding block and the TPM split direction of the subblock;

wherein the encoding unit is adapted to encode at least the current block of the video sequence using at least the one or more predicted samples.

With this, complex prediction using GEO is simplified by predicting a current coding block (also referred to as current block or to-be-predicted block) using TPM for the subblock. Values outside the subblock that remain constant then require less data for encoding and can be predicted with reduced computational effort.

In one embodiment, the prediction unit is adapted to perform the following steps during obtaining the one or more predicted samples:

setting the weights at positions of samples belonging to the subblock area equal to the corresponding weight of the TPM partitioning specified for the subblock; and setting the weights at positions of samples that do not belong to the subblock area equal to a constant value V. Setting values outside the subblock constant simplifies their encoding and reduces the amount of data required for these regions. Thereby, prediction is simplified and the encoded datastream can be reduced in size.

It may be provided that the constant value V depends on the coinciding sides of the current coding block and the subblock and the subblock split direction. This takes into account that the constant value may depend on the reference blocks used for the prediction and ensures that the encoder properly encodes the data, like the video sequence.

In one embodiment, the prediction unit is further adapted to select one of the allowed split directions as split direction for obtaining the predicted samples after determining the allowed split directions and before obtaining predicted samples.

More specifically, the prediction unit may be adapted to determine, as part of the selecting, whether there is more than one allowed split direction and, if there is more than one allowed split direction, to select one of the allowed split directions for obtaining the predicted samples. With this, the split direction among the more than one potentially allowed split directions can be chosen that allows for the most reliable prediction.

In one embodiment, the one or more parameters of the GEO inter prediction mode comprise at least one of: an angle parameter, a width W and/or a height H of the current block, a sample distance value that is determined using an aspect ratio, nCbR. These parameters can be used in the prediction of the current block but also in the prediction of the subblock. Thus, the current block can be encoded with GEO parameters even though TPM may apply for a subblock.

It can be provided that the prediction unit is adapted to determine the aspect ratio from the dimensions of the current block by $$nCbR = \frac{W}{H}.$$

This further allows for not providing the aspect ratio separately in case the split direction goes along a diagonal of the current block. The size of the encoded datastream is thereby reduced.

In one embodiment, the prediction unit is adapted to determine the aspect ratio from dimensions of the subblock, $$nCbR = \frac{nCbH}{nCbW},$$

wherein nCbH is a height of the subblock and nCbW is a width of the subblock. For subblocks with a center that does not coincide with the center of the current block, the aspect ratio of the current block is not easily used in the prediction. By providing the aspect ratio depending on the dimensions of the subblock, TPM within this subblock can reliably be used and, therefore, reliable encoding of the subblock is achieved.

It may be provided that the height of the subblock $nCbH = 2^p$ pixels and the width of the subblock $nCbW = 2^q$ pixels, with $q, p \in \mathbb{N}$. The aspect ratio is thereby provided as a value of basis 2 and to the power of $\pm(p-q)$. This makes further computation easier and may allow for fetching or providing the aspect ratio from a look-up table, LUT that can, for example, be provided in a header of the slice to which the block belongs.

In one embodiment, two opposite sides of the subblock coincide with two opposite sides of the current block. The center of the subblock is, in this case, only shifted with respect of the center of the current block in one dimension. This can make prediction of values in the subblock easier.

In one embodiment, the length of the opposite sides of the subblock is shorter than the length of the two opposite sides of the current block. This makes the subblock a real subset of the current block. Prediction of the current block is thereby reduced to predicting only the subblock and the values outside the subblock may remain constant. Thereby, encoding is simplified and the size of the encoded data can be reduced.

In another embodiment, two adjacent sides of the subblock coincide with two adjacent sides of the current block. The subblock is, in that case, arranged at an edge of the current block. The aspect ratio of the current block can, in that case, be used as aspect ratio in the subblock with reduced computational effort. Providing the aspect ratio of the subblock in addition to the aspect ratio of the current block can thereby be avoided, resulting in a reduced size of the encoded data.

It may be provided the length of at least one of the two adjacent sides of the subblock is shorter than then length of the corresponding side of the current block. This allows for rescaling of the aspect ratio of the current block to the aspect ratio of the subblock with reduced computational effort.

It may be provided that a center of the subblock coincides with a center of the current block or wherein the center of the subblock does not coincide with the center of the current block.

In one embodiment, a decoder for decoding an encoded video sequence using a method of an inter prediction process is provided, the decoder comprising:

a receiving unit;

a decoding unit;

wherein the receiving unit is adapted to receive the encoded video sequence, the encoded video sequence;

wherein the decoding unit is adapted to:
obtain, from the encoded video sequence, one or more parameters of a geometric merge, GEO, inter prediction mode for a current coding block of the video sequence
obtain, from the encoded video sequence, a size of a subblock that is smaller than the size of the current coding block
specify a position of the subblock within the current coding block, so that either two or three sides of the subblock coincide with the sides of the current coding block
determine one or more allowed split directions of a triangle partitioning mode, TPM, for the subblock depending on which of the sides of the subblock coincide with the sides of the current coding block
obtain one or more predicted samples for the current coding block by using the TPM partitioning performed for the subblock in accordance with the size of the subblock, the position of the subblock within the current coding block and the TPM split direction of the subblock;
wherein the decoding unit is adapted to decode at least the current block of the encoded video sequence using at least the one or more predicted samples.

With this decoder, the prediction of a current block can be reduced to the prediction of a subblock in which, compared to the reference blocks, samples have changed while the remainder of the current block outside the subblock may be unchanged and, therefore, potentially constant values can be used. This simplifies the computations necessary for predicting the current block.

In one embodiment the decoding unit is adapted to perform the following steps during obtaining the one or more predicted samples:
setting the weights at positions of samples belonging to the subblock area equal to the corresponding weight of the TPM partitioning specified for the subblock; and
setting the weights at positions of samples that do not belong to the subblock area equal to a constant value V. With this, the computational effort for predicting the values of the current block outside the subblock is reduced further.

More specifically, the constant value V may depend on the coinciding sides of the current coding block and the subblock and the subblock split direction. This allows for taking into account the reference block from which the values in the current block depend, depending on the splitting in the subblock. This further reduces the computational effort necessary for the decoding.

In one embodiment, the decoding unit is further adapted to select one of the allowed split directions as split direction for obtaining the predicted samples after determining the allowed split directions and before obtaining predicted samples.

More specifically, the decoding unit may be adapted to determine, as part of the selecting, whether there is more than one allowed split direction and, if there is more than one allowed split direction, to select one of the allowed split directions for obtaining the predicted samples. This results in a reasonable and reliable prediction.

In one embodiment, the one or more parameters of the GEO inter prediction mode comprise at least one of: an angle parameter, a width W and/or a height H of the current block, a sample distance value that is determined using an aspect ratio, nCbR. These values can be used for TPM as well, potentially requiring some recalculation. The size of the encoded datastream is thereby reduced, as no redundant information for the subblock needs to be provided.

In one embodiment, the decoding unit is adapted to determine the aspect ratio from the dimensions of the current block by $$nCbR = \frac{W}{H}.$$

Depending on the position of the subblock within the current block, this computation requires less processing capacity for the prediction. This makes the decoding more efficient.

In a further embodiment, the decoding unit is adapted to determine the aspect ratio from dimensions of the subblock, $$nCbR = \frac{nCbH}{nCbW},$$

wherein nCbH is a height of the subblock and nCbW is a width of the subblock. This allows for direct calculation of the aspect ratio from the dimensions of the subblock. The aspect ratio does thus not need to be provided in the encoded data, reducing the size of the encoded data.

In a further embodiment, the height of the subblock nCbH=$2^p$ pixels and the width of the subblock nCbW=$2^q$ pixels, with q,p$\in \mathbb{N}$. This results in aspect ratios having values to the basis of 2 and the power of $\pm$(p–q), depending on the split direction. This allows for providing only the values p and q in a table, for example a LUT provided in a header of the encoded data. These values can then be fetched from the table, reducing the computational effort necessary for decoding the subblock using TPM.

In a further embodiment, two opposite sides of the subblock coincide with two opposite sides of the current block. Prediction of the subblock is thereby simplified because the values provided for GEO for the current block can be recalculated because the subblock is only shifted in one dimension relative to the current block.

It may be provided that the length of the opposite sides of the subblock is shorter than the length of the two opposite sides of the current block.

Alternatively, two adjacent sides of the subblock coincide with two adjacent sides of the current block. The subblock thus represents an edge of the current block. Predicting this subblock can make use of the aspect ratio provided for the current block.

In one embodiment, the length of at least one of the two adjacent sides of the subblock is shorter than then length of the corresponding side of the current block. Thereby, it is possible to rescale values provided for the current block in a computationally efficient way.

In one embodiment, a center of the subblock coincides with a center of the current block or wherein the center of the subblock does not coincide with the center of the current block.

In one embodiment, a computer-readable storage medium comprising computer-executable instructions that, when executed by a computing system, cause the computing system to perform a method according to any of the above embodiments is provided.

In one embodiment, a method of inter-prediction for a current block for video coding implemented by a decoding device or encoding device is provided, wherein triangle merge mode is used to predict samples of the current block by weighting two samples of the two inter prediction candidates, the method comprising:

obtain parameters of GEO inter prediction mode define a size of a subblock, that is smaller than the size of the current coding block specify position of a subblock within a current coding block, so that either two or three sides of a subblock coincide with the sides of a current coding block determine allowed split directions of a TPM partitioning for the subblock depending on which of the sides of the subblock coincide with the sides of the current coding block obtain predicted samples for the GEO block by using TPM process performed for the subblock in accordance with the subblock size, subblock position within the current block and the TPM split direction of the subblock, the process of obtaining predicted samples comprising:

setting the weights at positions of samples belonging to the subblock area equal to the corresponding weight of the TPM partitioning specified for the subblock; and setting the weights at positions of samples that do not belong to the subblock area equal to the constant value V, wherein the constant value V depend on the coinciding sides of the current coding block and the subblock splitting direction.

Thereby, prediction is reduced to predicting the subblock while the values outside the subblock remain constant. This reduces the computational efforts necessary for the prediction and can reduce the size of the encoded datastream. Thereby, also the amount of data that needs to be processed by the decoder can be reduced.

In one embodiment, parameters of GEO inter prediction mode comprise: angle parameter, width and height of the current block, sample distance value that is determined using aspect ratio nCbR. These can be used for TPM as well, potentially requiring some modification or transformation or recalculation. This reduces the size of the encoded datastream and the amount of data that needs to be processed by a decoder.

In one embodiment, the aspect ratio is determined from the dimensions of the current block $$\left(nCbR = \frac{W}{H}\right).$$

This is specifically advantageous in case the subblock has a center that coincides with the center of the current block, because the computations necessary for encoding/decoding do then require less calculations to obtain values for the TPM merge mode.

In a further embodiment, the aspect ratio is determined from the dimensions of the subblock $$\left(nCbR = \frac{nCbH}{nCbW}\right).$$

Here, nCbH and nCbW are the height and the width of the subblock, respectively. By this determination, the aspect ratio can be obtained from the outer dimensions of the subblock. With this, it is not necessary to provide the aspect ratio of the subblock in the datastream, reducing the size of the encoded datastream and the amount of data that needs to be decoded by the decoder.

In one embodiment, the subblock width and subblock height are a power-of two values. This allows computational easy calculation of the aspect ratio. Further, the aspect ratio then only depends on the powers p and q, for example, which specify height and width of the subblock. These can be provided, for example, in a LUT from which these values can be fetched in a computationally easy way during decoding and encoding.

In one embodiment, two sides of the subblock coincide with the two opposite sides of the current block. This allows for reusing the parameters of the current block provided as GEO parameters also for the TPM merge mode.

In one embodiment, two adjacent sides of the subblock coincide with the two adjacent sides of the current block. The subblock is thus arranged in an edge of the current block. This allows for using an aspect ratio of the current block also for the calculations in TPM merge mode.

In one embodiment, a decoder or an encoder comprising processing circuitry for carrying out the method according to any one of the above embodiments is provided. This provides the advantages of the above methods for decoding and/or encoding of data.

A computer program product comprising a program code for performing the method according to any one of the above embodiments may be provided.

In one embodiment, a decoder or an encoder are provided, comprising:
  one or more processors; and
  a non-transitory computer-readable storage medium coupled to the processors and storing programming for execution by the processors, wherein the programming, when executed by the processors, configures the decoder to carry out the method according to any one of the above embodiments. The decoder or encoder can thus apply the advantageous methods above for decoding and/or encoding.

In one embodiment, a method of inter-prediction for a current block for video coding implemented by a decoding device or encoding device is provided, wherein the method comprises:
  obtaining a value of a parameter of Geometric merge mode (GEO) inter prediction mode for a current coding block;
  obtaining a value of a size (e.g. width or height) of a subblock, wherein the size of the subblock is smaller than a size of the current coding block (e.g., a height of the subblock is smaller than a height of the current coding block, or a width of the subblock is smaller than a width of the current coding block. In some examples, when a height of the subblock is smaller than a height of the current coding block, a width of the subblock may be equal to a width of the current coding block; or when a width of the subblock is smaller than a width of the current coding block, a height of the subblock may be equal to a height of the current coding block);
  obtaining values of predicted samples using triangle merge mode (TPM) process performed for the subblock, wherein the step of obtaining values of predicted samples comprise:
  setting a weight value corresponding to a sample position in the subblock equal to a corresponding weight value of the TPM partitioning specified for the subblock; and
  setting a weight value corresponding to a sample position that is not in the subblock equal to a constant value V (in some examples, the constant value V is depended on the coinciding sides of the current coding block and the subblock splitting direction).

Thereby, prediction of values of a current block is reduced to prediction of the subblock using TPM while the values outside the subblock are constant. The computational effort necessary for the prediction is thereby reduced.

In one embodiment, the parameter of GEO inter prediction mode is an angle parameter, or a width, or a height, or a sample distance value that is determined using an aspect ratio nCbR. These values can also be used in the TPM, making additional provision of parameters for the TPM at least partially obsolete and reducing the size of the encoded data and the size of the data that needs to be decoded.

In one embodiment, the aspect ratio nCbR is determined according to the dimensions of the current coding block $$\left(nCbR = \frac{W}{H}\right).$$

If the subblock is arranged within the current block in a way that this aspect ratio can be further used, the computational resources required for encoding/decoding can be reduced.

In one embodiment, the aspect ratio nCbR is determined from the dimensions of the subblock $$\left(nCbR = \frac{nCbH}{nCbW}\right).$$

Here, nCbH and nCbW are the height and the width of the subblock, respectively. With this, it is not necessary to provide the aspect ratio in addition to the other parameter values for TPM, reducing the amount of potentially redundant information.

In one embodiment, the value of the size (e.g. width or height) of the subblock comprises a height value of the subblock and a width value of the subblock, and the height value of the subblock and the width value of the subblock are a power-of two values. Calculations with such values are computationally easy. Further, the powers can be provided in a LUT which can in turn be provided in a header of a slice to which the block belongs. Specifically, the powers p and q may act as indices for entries in the LUT, where the entries are provided as aspect ratios and/or angle values. These can then be fetched and further calculations be done with reduced computing resources required.

In one embodiment, two sides of the subblock coincide with the two opposite sides of the current coding block. This subblock is thus potentially only shifted with respect to the center of the current block or even coincides with it. This can make TPM merge mode calculations easier and further the parameters of GEO can be used.

In one embodiment, two adjacent sides of the subblock coincide with the two adjacent sides of the current coding block. In that case, the subblock is arranged in an edge of the current block. Here, the aspect ratio calculated for the current block can also be used directly for the subblock.

There can be provided a decoder or an encoder comprising processing circuitry for carrying out the method according to any one the above embodiments. With this, the advantages of the methods of the above embodiments can be used for encoding and decoding.

In one embodiment, a computer program product comprising a program code for performing the method according to any one of the above embodiments is provided.

In one embodiment, a decoder or an encoder are provided, comprising:
one or more processors; and
a non-transitory computer-readable storage medium coupled to the processors and storing programming for execution by the processors, wherein the programming, when executed by the processors, configures the decoder to carry out the method according to any one of the above embodiments. Thus, the advantages of the methods referred to above are applied in decoders and encoders for encoding, for example, video sequences with increased efficiency.

BRIEF DESCRIPTION OF THE DRAWINGS

In the following embodiments of the disclosure are described in more detail with reference to the attached figures and drawings, in which:

FIG. 13 illustrates an example implementation of predefined lookup table for stepD;

FIG. 14 illustrates an example implementation of predefined lookup table for f( );

Figure 1A:
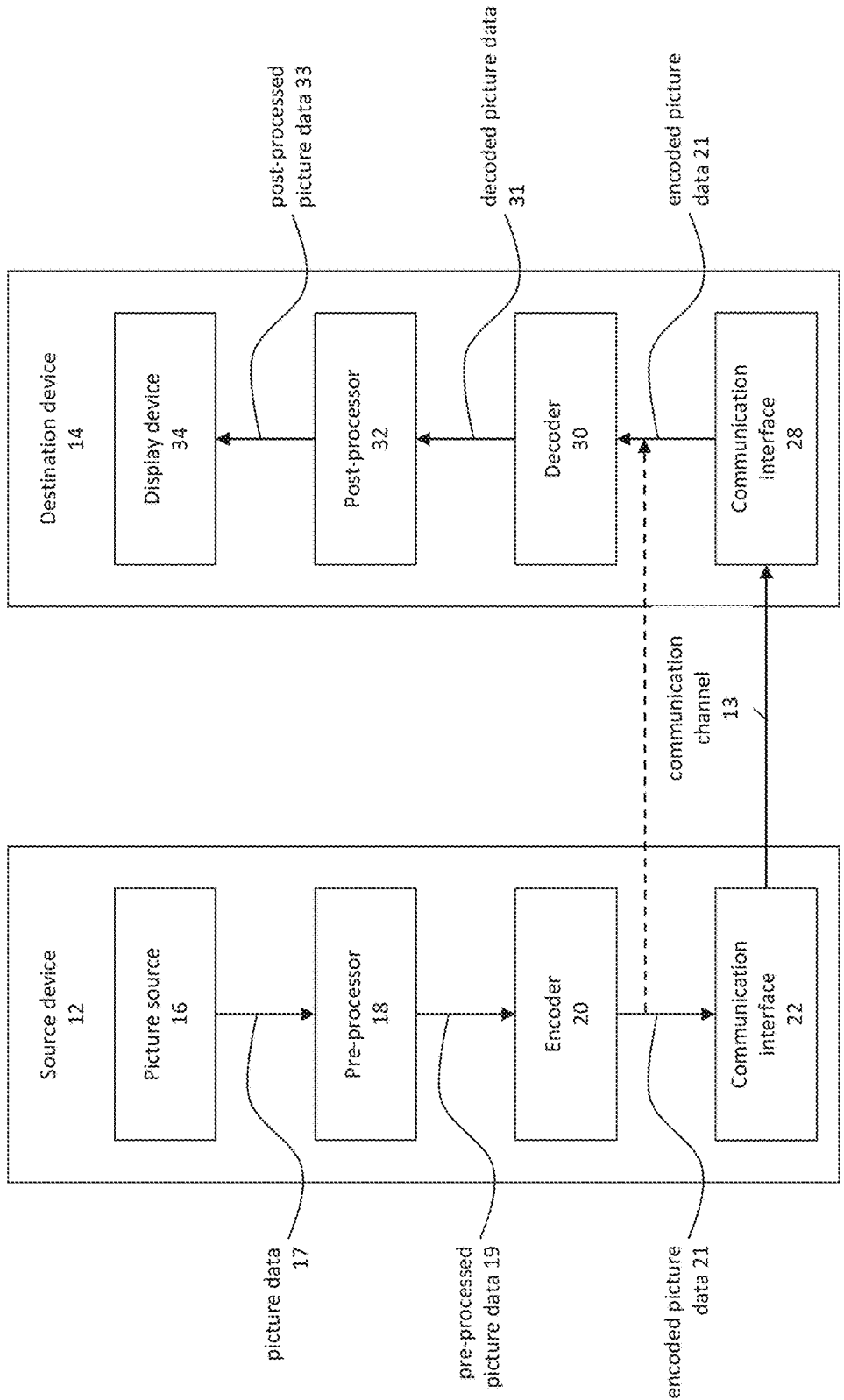
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 may comprise a source device 12 configured to provide encoded picture data 21 e.g. to a destination device 14 for decoding the encoded picture data 13.

The source device 12 may comprise an encoder 20, and may additionally, in some embodiments, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 may comprise a decoder 30 (e.g. a video decoder 30), and may additionally, in some embodiments, comprise a communication interface or communication unit 28, a post-processor 32 (or post-processing unit 32) and a display device 34.

The communication interface 28 of the destination device 14 may be configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 may be configured to receive the encoded picture data 21 and provide decoded picture data 31 or a decoded picture 31 (further details will be described below, e.g., based on FIG. 3 or FIG. 5).

The post-processor 32 of destination device 14 may be configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

Further, the source device 12 and/or the destination device 14 may be implemented using only software. In such a case, the functionality of the source device 12 and/or the destination device 14 may be provided by one or more potentially specifically designed software modules that interact with other hardware, like processing circuitry and/or memory to perform the respective functionality.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
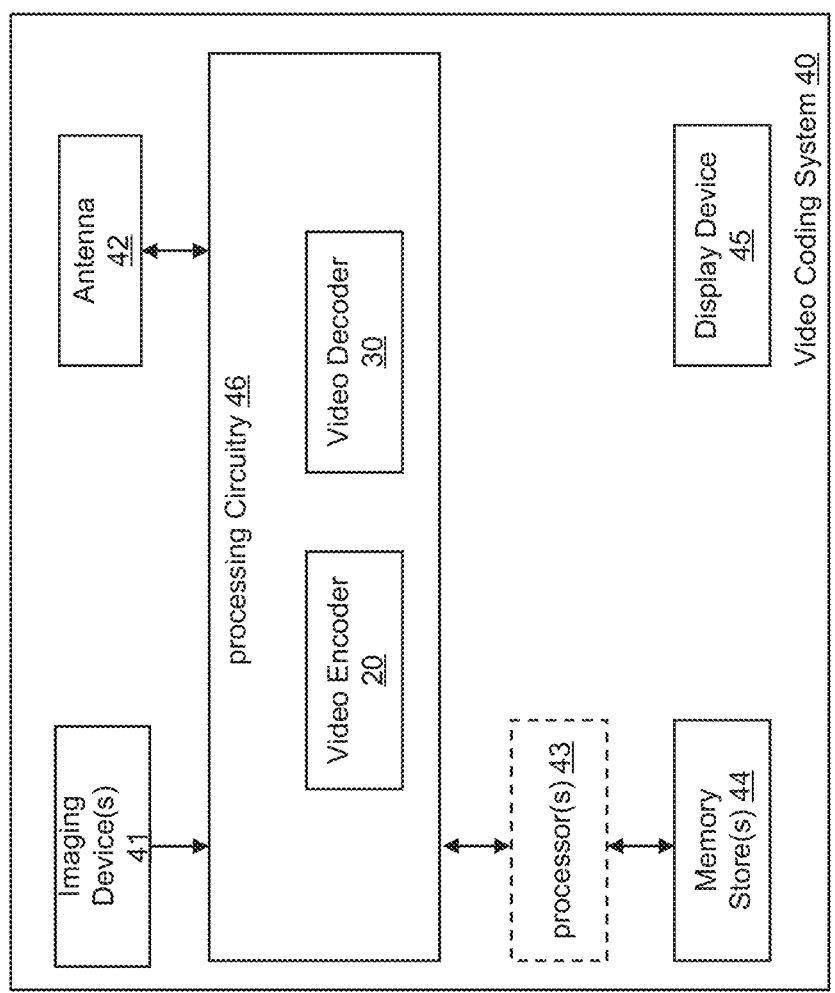
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (WC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or WC.

Encoder and Encoding Method

Figure 2:
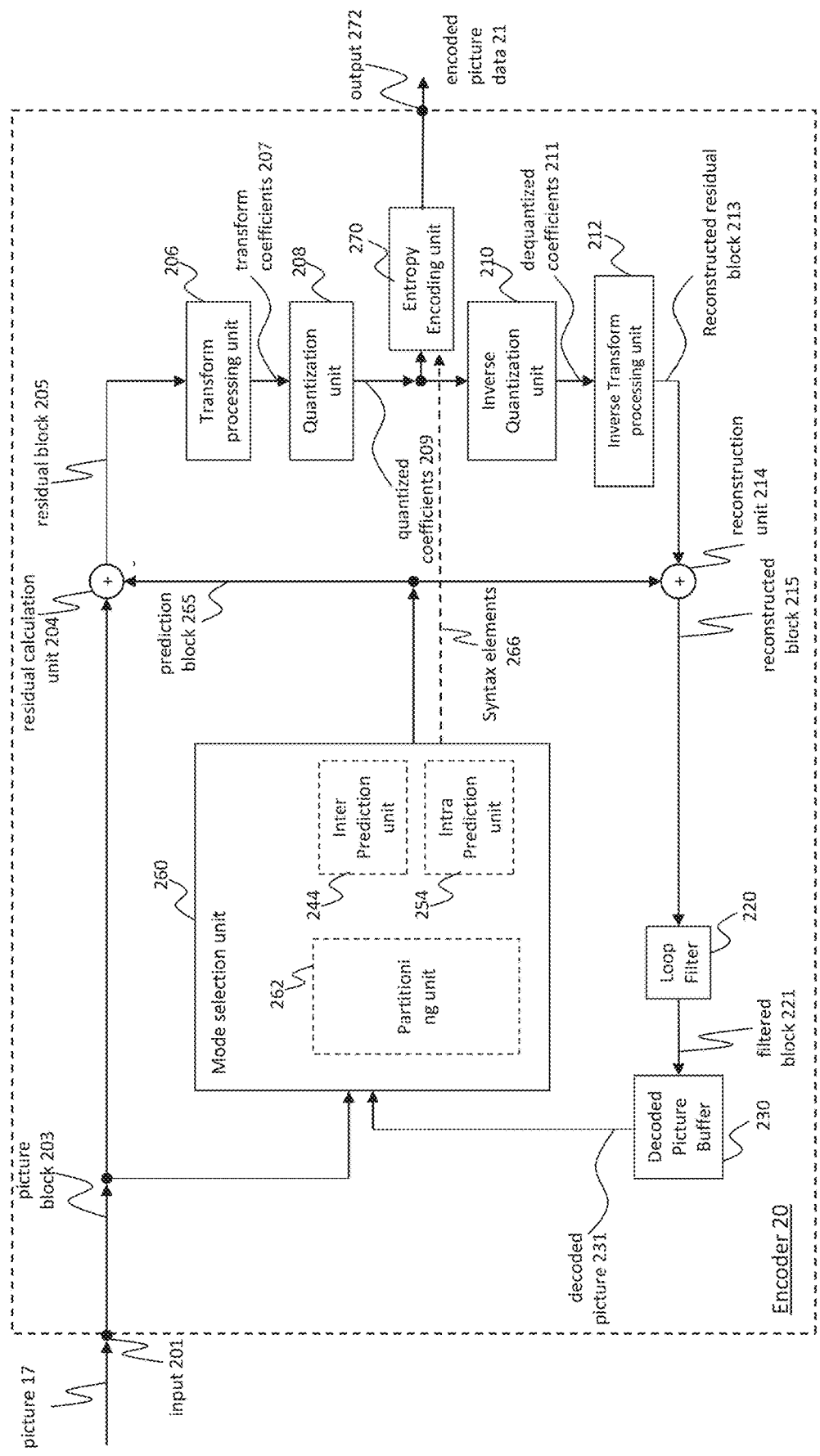
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 may comprise an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
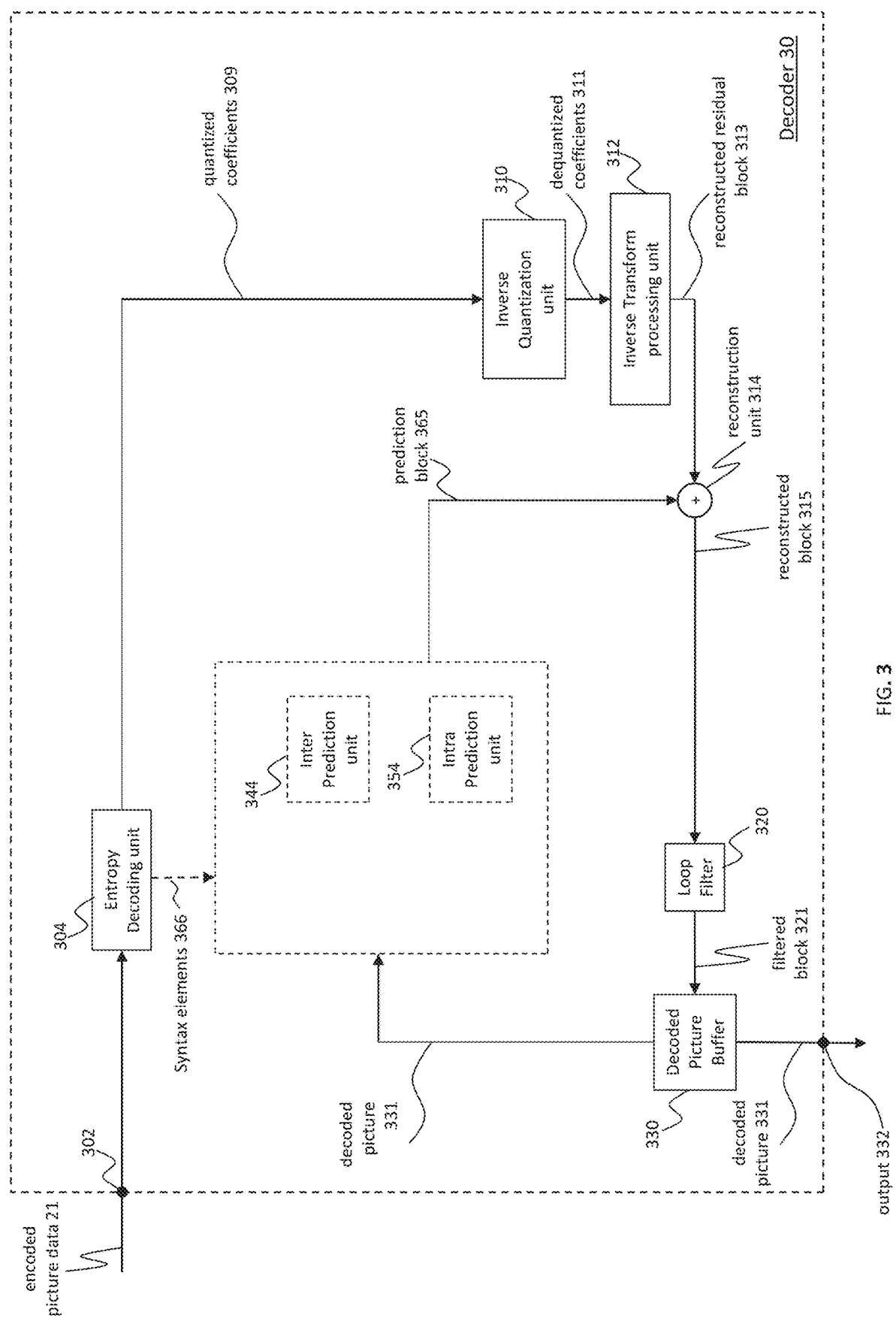
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 may comprise partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215. Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 may be configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 may be configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) may be configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture may then be stored in decoded picture buffer 330, which stores the decoded pictures 331 as reference pictures for subsequent motion compensation for other pictures and/or for output respectively display.

The decoder 30 may be configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 may be configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)}$~$2^{(bitDepth-1)}-1$, where "^" means exponentiation. For example, if bitDepth is set equal to 16, the range is $-32768$~$32767$; if bitDepth is set equal to 18, the range is $-131072$~$131071$. Here are provided two methods for constraining the motion vector.

Method 1: Remove the Overflow MSB (Most Significant Bit) by Flowing Operations $$ux = (mvx + 2^{bitDepth}) \% 2^{bitDepth} \tag{1}$$

$$mvx = (ux >= 2^{bitDepth-1}) ? (ux - 2^{bitDepth}) : ux \tag{2}$$

$$uy = (mvy + 2^{bitDepth}) \% 2^{bitDepth} \tag{3}$$

$$mvy = (uy >= 2^{bitDepth-1}) ? (uy - 2^{bitDepth}) : uy \tag{4}$$

For example, if the value of mvx is $-32769$, after applying formula (1) and (2), the resulting value is 32767. In computer system, decimal numbers are stored as two's complement. The two's complement of $-32769$ is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \tag{5}$$

$$mvx = (ux >= 2^{bitDepth-1}) ? (ux - 2^{bitDepth}) : ux \tag{6}$$

$$uy = (mvpy + mvdy + 2^{bitDepth}) \% 2^{bitDepth} \tag{7}$$

$$mvy = (uy >= 2^{bitDepth-1}) ? (uy - 2^{bitDepth}) : uy \tag{8}$$

The operations may be applied during the sum of mvp and mvd, as shown in formula (5) to (8).

Method 2: Remove the Overflow MSB by Clipping the Value $$vx = Clip3(-2^{bitDepth-1}, 2^{bitDepth-1}-1, vx)$$

$$vy = Clip3(-2^{bitDepth-1}, 2^{bitDepth-1}-1, vy)$$

where the definition of function Clip3 is as follow:

$$Clip3(x, y, z) = \begin{cases} x; & z < x \\ y; & z > y \\ z; & \text{otherwise} \end{cases}$$

Figure 4:
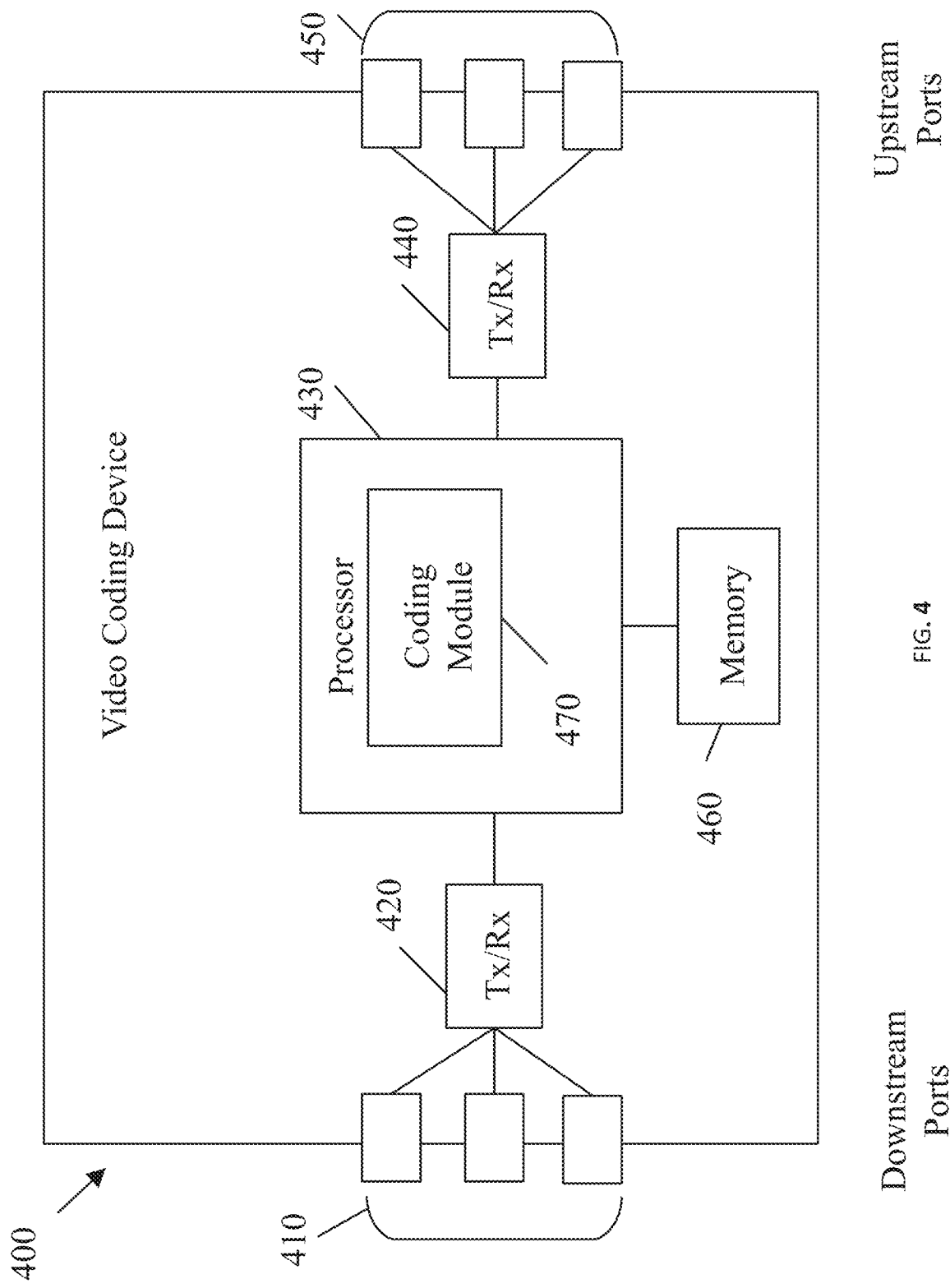
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
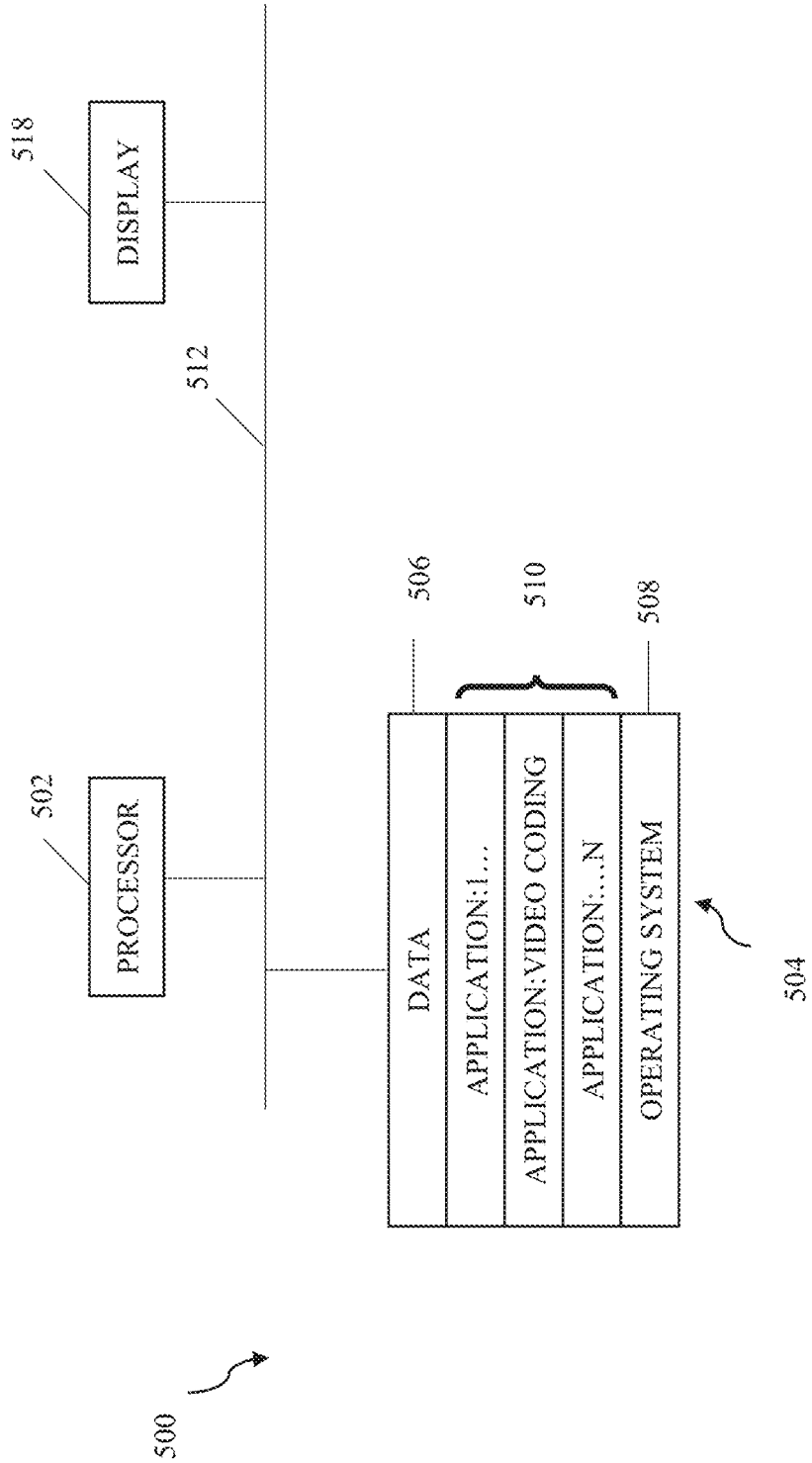
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In an example about Merge Candidate List Construction according to ITU-T H.265, a merge candidate list is constructed based on the following candidates:
1. up to four spatial candidates that are derived from five spatial neighboring blocks,
2. one temporal candidate derived from two temporal, co-located blocks,
3. additional candidates including combined bi-predictive candidates and,
4. zero motion vector candidates.

Spatial Candidates

Figure 6B:
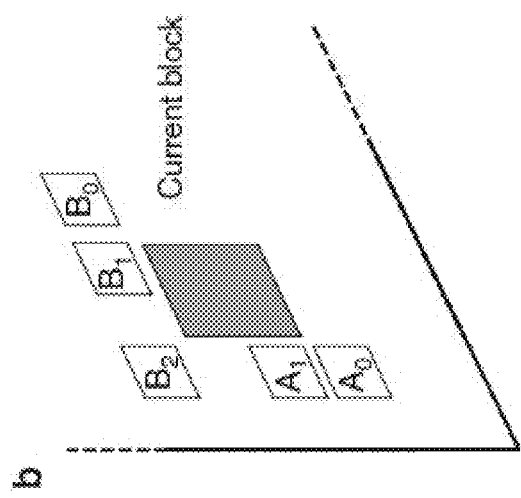
FIG. 6b illustrates an example of spatial neighbor blocks.

The motion information of spatial neighbor blocks are first added into the merge candidate list (in an example, the merge candidate list may be an empty list before the first motion vector is added into the merge candidate list) as motion information candidates. Here, the neighboring blocks that are considered to be inserted in the merge list are illustrated in FIG. 6b. For inter-prediction block merging, up to four candidates are inserted in the merge list by sequentially checking A1, B1, B0, A0 and B2, in that order.

Motion information may contain all motion data including the information whether one or two reference picture lists are used as well as a reference index and a motion vector for each reference picture list.

In an example, after checking whether a neighboring block is available and contains motion information, some additional redundancy checks are performed before taking all the motion data of the neighboring block as a motion information candidate. These redundancy checks can be divided into two categories for two different purposes:
  Category 1, avoid having candidates with redundant motion data in the list,
  Category 2, prevent merging two partitions that could be expressed by other means which would create redundant syntax.

Temporal Candidates

Figure 6A:
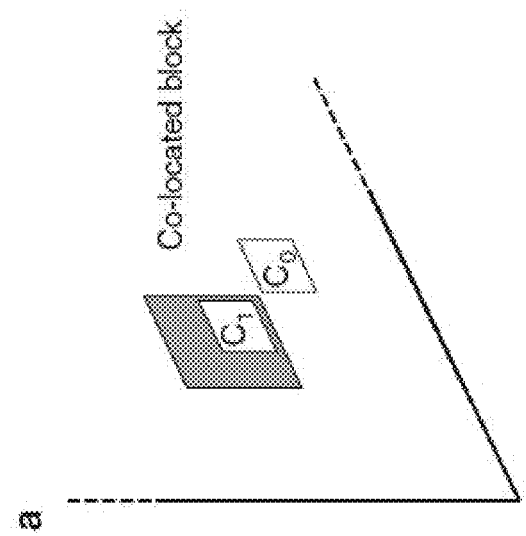
FIG. 6a illustrates an example of Co-located block.

The FIG. 6a illustrated the coordinates of the blocks where temporal motion information candidates are retrieved from. Collocated block is the block that has the same −x, −y coordinates of the current block, but is on a different picture (one of the reference pictures). The temporal motion information candidates are added to the merge list if the list is not full (in an example, the merge list is not full when a quantity of candidates in the merge list is smaller than a threshold, for example, the threshold may be 4, 5, 6, and so on).

Generated Candidates

After insertion of spatial and temporal motion information candidates, if the merge list is still not full, generated candidates are added to fill the list. The list size is indicated in the sequence parameter set and is fixed throughout the whole coded video sequence.

The merge list construction process in ITU-T H.265 and in VVC outputs a list of motion information candidates. The merge list construction process of VVC is described in the "8.3.2.2 Derivation process for luma motion vectors for merge mode" section of the document JVET-L1001_v2 Versatile Video Coding (Draft 3), which is publicly available under http://phenix.it-sudparis.eu/jvet/. The term motion information refers to the motion data that is necessary to perform motion compensated prediction process. The motion information usually refers to the following information:
Whether the Block Applies Uni-Prediction or Bi-Prediction
  The ID of the reference picture that is used in the prediction. (2 IDs if block applies bi-prediction).

Motion Vector (2 Motion Vectors if Block is Bi-Predicted)
Additional Information In VVC and H.265, the list of candidates that are output of the merge list construction include N candidate motion information. The number N is typically included in the bitstream and can be a positive integer number such as 5, 6 etc. The candidates that are included the in the constructed merge list might include uni-prediction information or bi-prediction information. This means that the candidate that is selected from the merge list might indicate a bi-prediction operation.

Bi-Prediction

A special mode of inter prediction is called "bi-prediction", where 2 motion vectors are used to predict a block. The motion vectors can point to same or different reference pictures, where a reference picture can be indicated by a reference picture list ID and a reference picture index. For example, a first motion vector might point to a first picture in the reference picture list L0 and a second motion vector might point to a first picture in the reference picture list L1. Two reference picture lists (for example, L0 and L1) might be maintained and the picture pointed by the first motion vector is selected from list L0 and the picture pointed by the second motion vector is selected from list L1.

In an example, if a motion information indicates bi-prediction, then the motion information includes two parts:
L0 part: A motion vector and a reference picture index that points to an entry in the reference picture list L0.
L1 part: A motion vector and a reference picture index that points to an entry in the reference picture list L1.

Picture Order Count (POC): A variable that is associated with each picture, uniquely identifies the associated picture among all pictures in the CVS (Coded Video Sequence), and, when the associated picture is to be output from the decoded picture buffer, indicates the position of the associated picture in output order relative to the output order positions of the other pictures in the same CVS that are to be output from the decoded picture buffer.

Each of the reference picture lists L0 and L1 might include one or more reference pictures each of which is identified with a POC. The association with each reference index and the POC value might be signaled in the bitstream. As an example the L0 and L1 reference picture lists might include the following reference pictures:

| Reference Picture List | Reference Index | POC |
|---|---|---|
| L0 | 0 | 12 |
| L0 | 1 | 13 |
| L1 | 0 | 13 |
| L1 | 1 | 14 |

In the example above, the first entry (indicated by reference index 0) in reference picture list L1 is the reference picture with POC value 13. The second entry (indicated by reference index 1) in reference picture list L1 is the reference picture with POC value 14.

Triangular Prediction Mode

Figure 7:
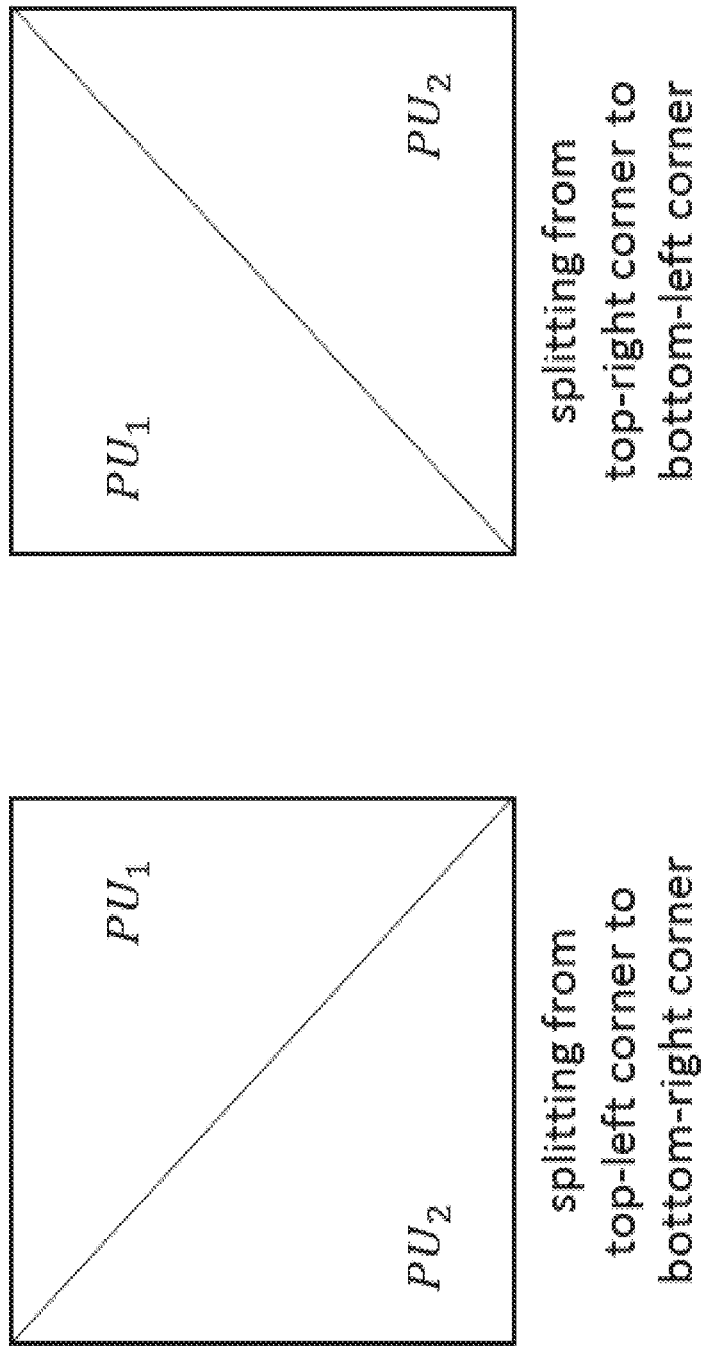
FIG. 7 illustrates some examples of triangular prediction mode.

The concept of the triangular prediction mode is to introduce a triangular partition for motion compensated prediction. As an example shown in FIG. 7, two triangular prediction units are used for a CU, in either diagonal or inverse diagonal direction. Each triangular prediction unit in the CU is inter-predicted, using uni-prediction motion vector and reference frame index which are derived from a uni-prediction candidate list. An adaptive weighting process is performed to the diagonal edge after the samples that are associated with each triangular prediction unit have been predicted for example by motion-compensation or intra-picture prediction. Then, the transform and quantization process are applied to the whole CU. It is noted that this mode is only applied to skip mode and merge mode.

In the triangular prediction mode, a block is split into two triangular parts (as in FIG. 7), and each part can be predicted using one motion vector. A motion vector which is used to predict one triangle part (denoted with PU1) can be different from a motion vector which is used to predict the other triangle part (denoted with PU2). In an example, it is noted that each part can be predicted only using a single motion vector (uni-prediction) in order to reduce the complexity of performing the triangle prediction mode. In other words, the PU1 and PU2 may not be predicted using bi-prediction, which comprises two motion vector.

Sub-Block Prediction Mode

Figure 8:
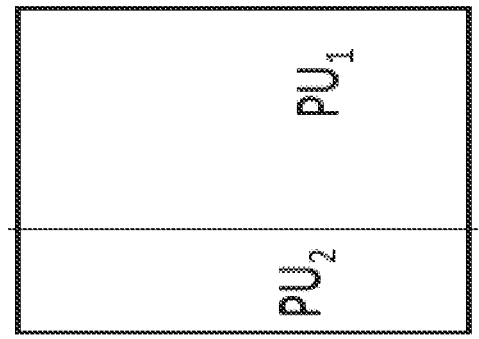
FIG. 8 illustrates some examples of Sub-block prediction mode.
Figure 8:
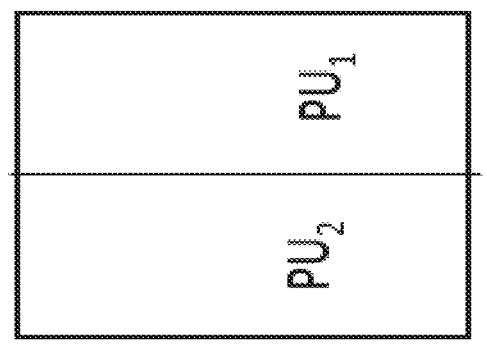
Figure 8:
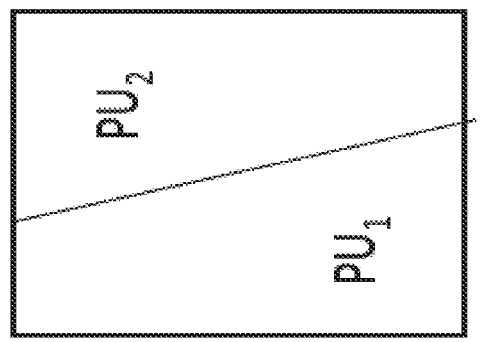

Triangular prediction mode is a special case of sub-block prediction, where a block is divided into two blocks. In the above example two block division directions are illustrated (45 degree and 135 degree partitions.) However, it is noted that other partition angles and partition proportions are also possible (For example, examples in FIG. 8).

In some examples, the block is split into 2 sub-block parts and each part is required to apply uni-prediction. Compared to the triangular prediction mode, the difference is how the block is divided into 2 parts, therefore it represents a generalized version of triangular prediction.

Triangular prediction mode is a special case of sub-block prediction, where a block is divided into two blocks. In the above examples, two block division directions are illustrated (45 degree and 135 degree partitions). Other partition angles and partition proportions are also possible (For example, examples in FIG. 8).

In some examples, the block is split into 2 sub-blocks and each part (sub-block) is predicted with uni-prediction.

In an example, according to use sub-block partition mode, the following steps are applied to obtain prediction samples:

Step 1: divide a coding block into 2 sub-blocks, according to a geometric model. This model may result in the splitting of the block by a separation line (for example, a straight line) as exemplified in FIG. 9-12.

Step 2: obtain a first prediction mode for a first sub-block and a second prediction mode for a second sub-block. In an example, the first prediction mode is not identical to the second prediction mode. In an example, a prediction mode (first prediction mode or second prediction mode) may be an inter prediction mode, information for an inter prediction mode may comprise a reference picture index and a motion vector. In another example, the prediction mode may be an intra-prediction mode, information for an intra the prediction mode may comprises an intra prediction mode index.

Step 3: Generate first prediction values and second prediction values, using the first prediction mode and second prediction mode, respectively.

Step 4: obtain the combined values of prediction samples according to the combination of the first prediction values and the second prediction values, according to the division which is disclosed in Step 1.

Figure 9:
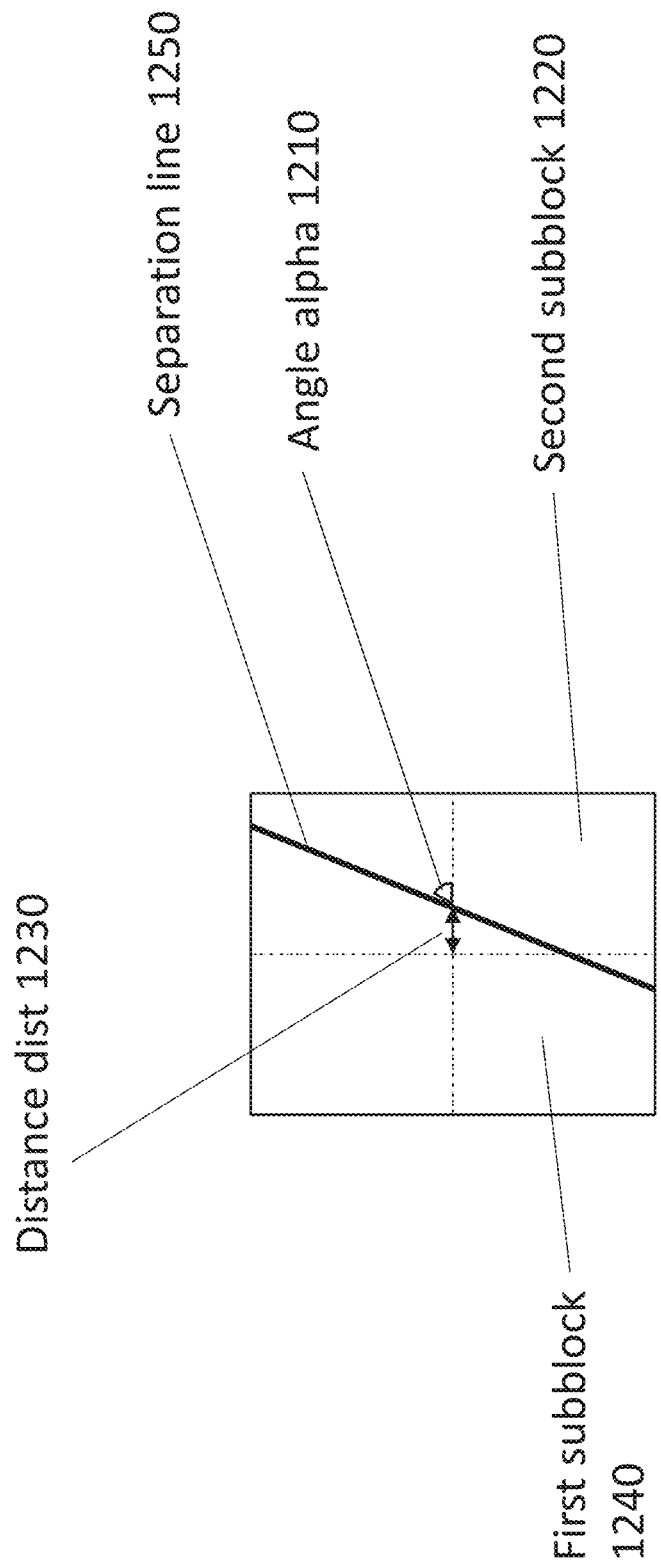
FIGS. 9-12 show some examples about a partition of a block.

In an example, in step 1, a coding block is divided into 2 sub-blocks in various ways. FIG. 9 shows an example about partition of a coding block, a separation line 1250 divides the block into 2 subblocks. In order to describe the line 1250, two parameters are signalled, one parameter is angle alpha 1210 and the other parameter is distance dist 1230.

In some embodiments, the angle, as indicated in FIG. 9, is measured between the x-axis and the separation line, whereas the distance is measured by the length of the vector which is perpendicular to the separation line and passing through the center of the current block.

Figure 10:
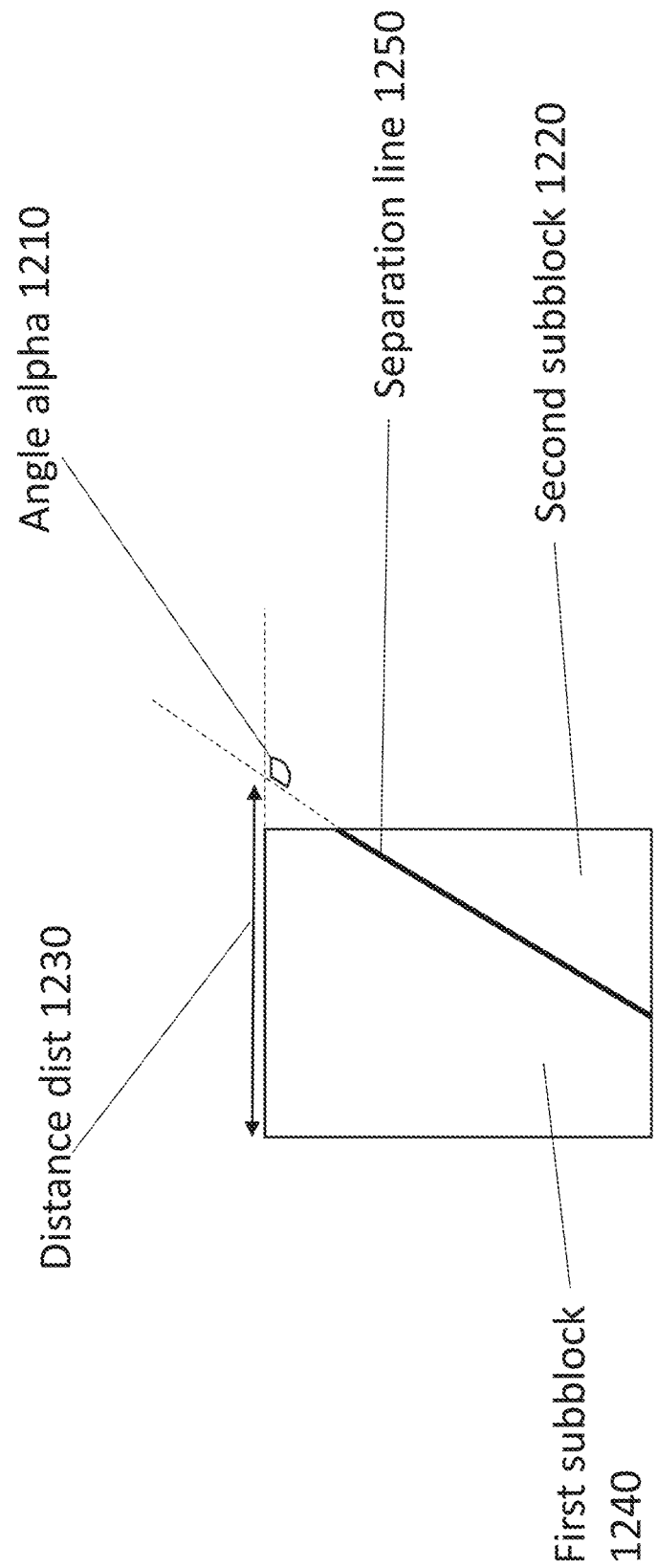
Figure 11:
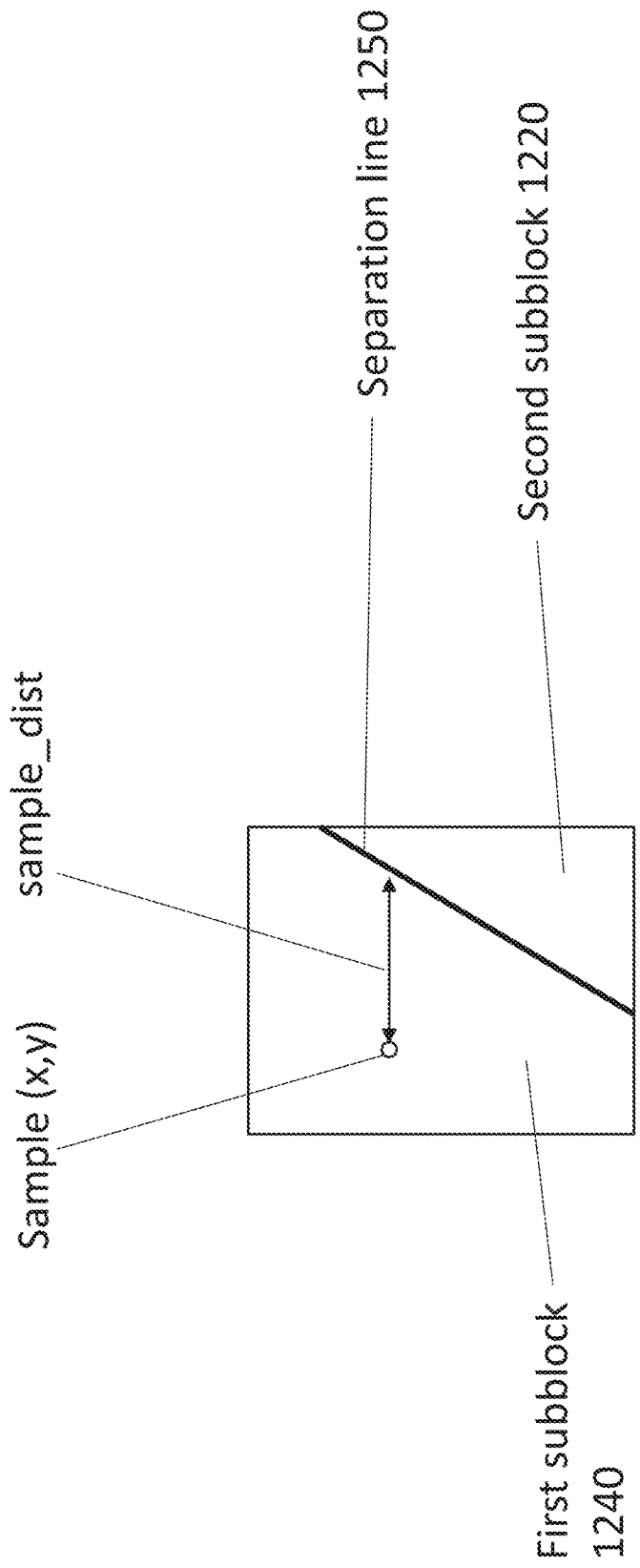
Figure 12:
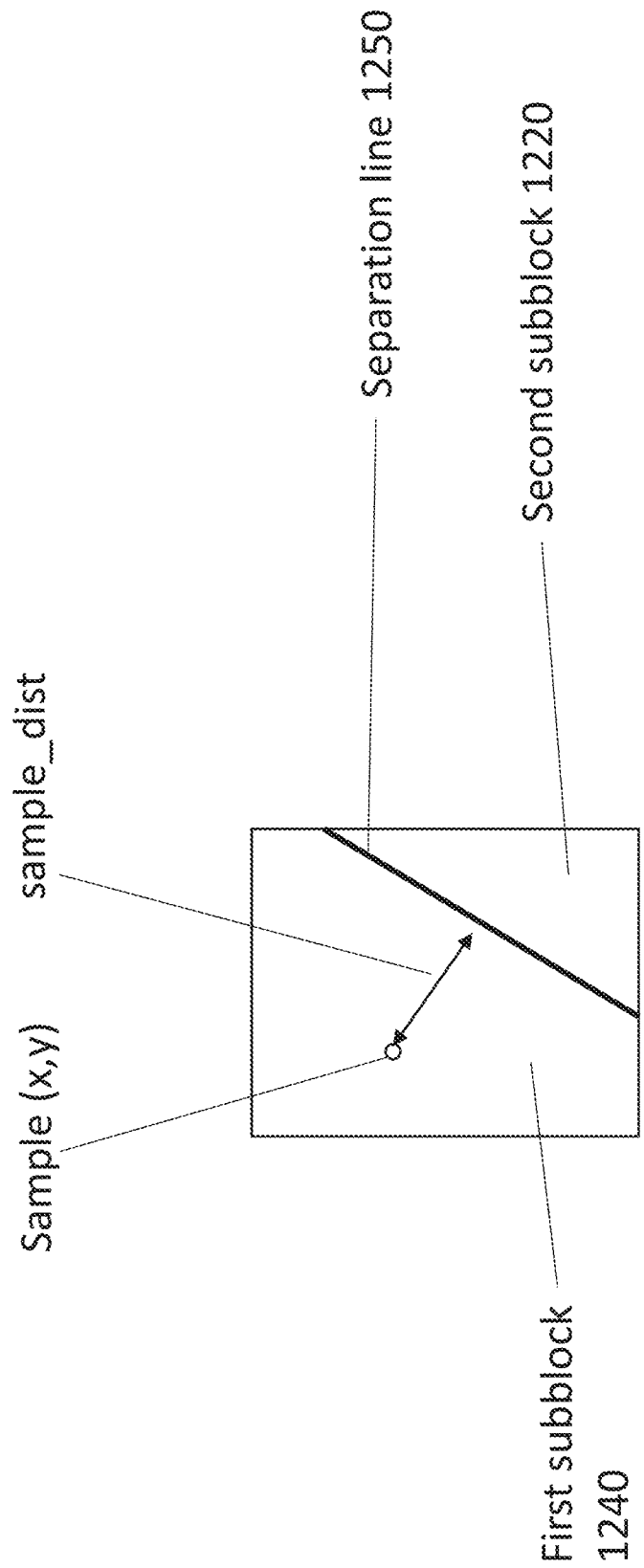

In another example, FIG. 10 shows an alternative way of representing the separation line, where the examples of the angle and the distance are different with the examples showed in FIG. 9.

In some example, in step 4, the division disclosed in Step 1 is used for the combination of the first prediction values and second prediction values, to obtain the final prediction values. In an example, a blending operation is applied in step 4 in order to eliminate any artefacts (edgy or jugged appearance along the separation line). The blending operation can be described as a filtering operation along the separation line.

In the encoder side, a separation line (the parameters defining the line, e.g. the angular and distance) is determined based on a rate-distortion based cost function. The determined line parameters are encoded into the bitstream. In the decoder side, the line parameters are decoded (obtained) according to the bitstream.

In an example, in the case of 3 video channels, which comprise a luminance component and two chrominance components, a first prediction and a second prediction is generated for each channel.

As there are many possibilities of dividing a coding block into 2 subblocks, the signaling (coding) of the division requires too many bits. Since the angle and distance values can have many different values, which require too much side information to be signaled in a bitstream, a quantization scheme is applied to the angle and distance side information to improve coding efficiency.

Embodiments of the present disclosure are about signalling of the partitioning parameters, for example, a quantized angle parameter alphaIdx and a quantized distance parameter distanceIdx.

In an example, in a quantization scheme, an angle value and a distance value can be quantized by a linear, uniform quantizer according to alphaIdx=Round(alpha/Δalpha), distanceIdx=Round(dist/Δdist), where the variables Δalpha and Δdist represent quantization step sizes for the angular parameter and distance parameter of a separation line. Accordingly, an angle alpha and a distance dist may be reconstructed using values of alphaIdx and distanceIdx that obtained from a bitstream as alpha=alphaIdx*Δalpha, dist=distanceIdx*Δdist.

In an example, if an angular quantization step size is equal to Δalpha=11.25°, the value of alphaIdx may range from 0 to 31 (includes 0 and 31) to cover the allowed angles in the Euclidean plane. In another example, the value of the angular quantization step size is equal to Δalpha=22.5°, thereby the value of alphaIdx may range from 0 to 15 (includes 0 and 15).

In some embodiments, a method is disclosed to quantize the distance information in dependence of the angular, in the case that a linear and uniform quantizer is used to quantize the angular, meaning that the value of Δalpha is constant for a given coding (decoding or encoding) block.

The goal of the disclosed quantization scheme is to evenly distribute the allowed separation lines for a given coding block, which can have different sizes and aspect ratios. The evenly distributed space of quantized angle and distance parameters improves the coding efficiency of non-rectangular components and allows a compact representation of the separation line parameters.

In some embodiments, a method of partitioning a rectangular coding block (also referred to as current block) by a straight line is provided, where the straight line is parametrized by a pair of parameters, representing a quantized angle and a quantized distance value and where the quantized distance value is derived according to a quantization process, depending on the value of the angle and the aspect ratio of the coding block. It is noted that the way in which quantization is performed for the angle is generally arbitrary and may be provided depending on certain requirements. For example, quantizing the angle so that tan(alpha)=$2^n$, n∈ℕ may be preferred because calculations with values to the basis of 2 with natural numbers as exponents are computationally easy.

In an example, a distance may be quantized in such a manner, that a given value range of distanceIdx shall be satisfied, for example, a value range from 0 to 3 (includes 0 and 3). In another example, the distance may be quantized for a given block in such a manner, that the separation lines for given pairs of angleIdx and distanceIdx values are evenly distributed and a separation line shall never lie outside of the area of the given coding block.

Figure 15:
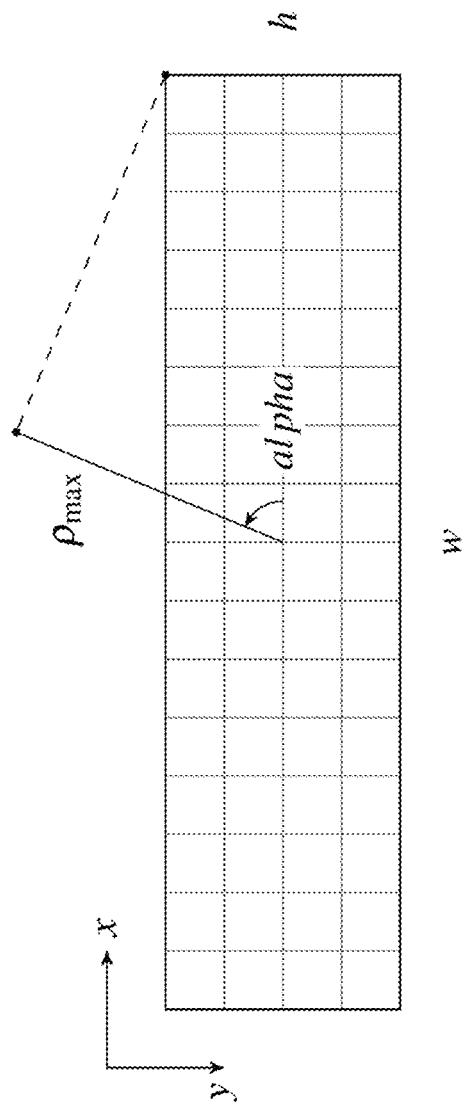
FIG. 15 illustrates an example of the quantization aspect relating to the predefined lookup table for stepD.

In a first step, a maximum distance $\rho_{max}$ can be derived depending on the angle, such that all separation lines with a distance value 0<dist<$\rho_{max}$ are confined to the coding block (e.g. they are intersecting the boundary of the coding block). This is exemplified in FIG. 15 for a coding block of size 16×4 luminance samples.

Figure 16:
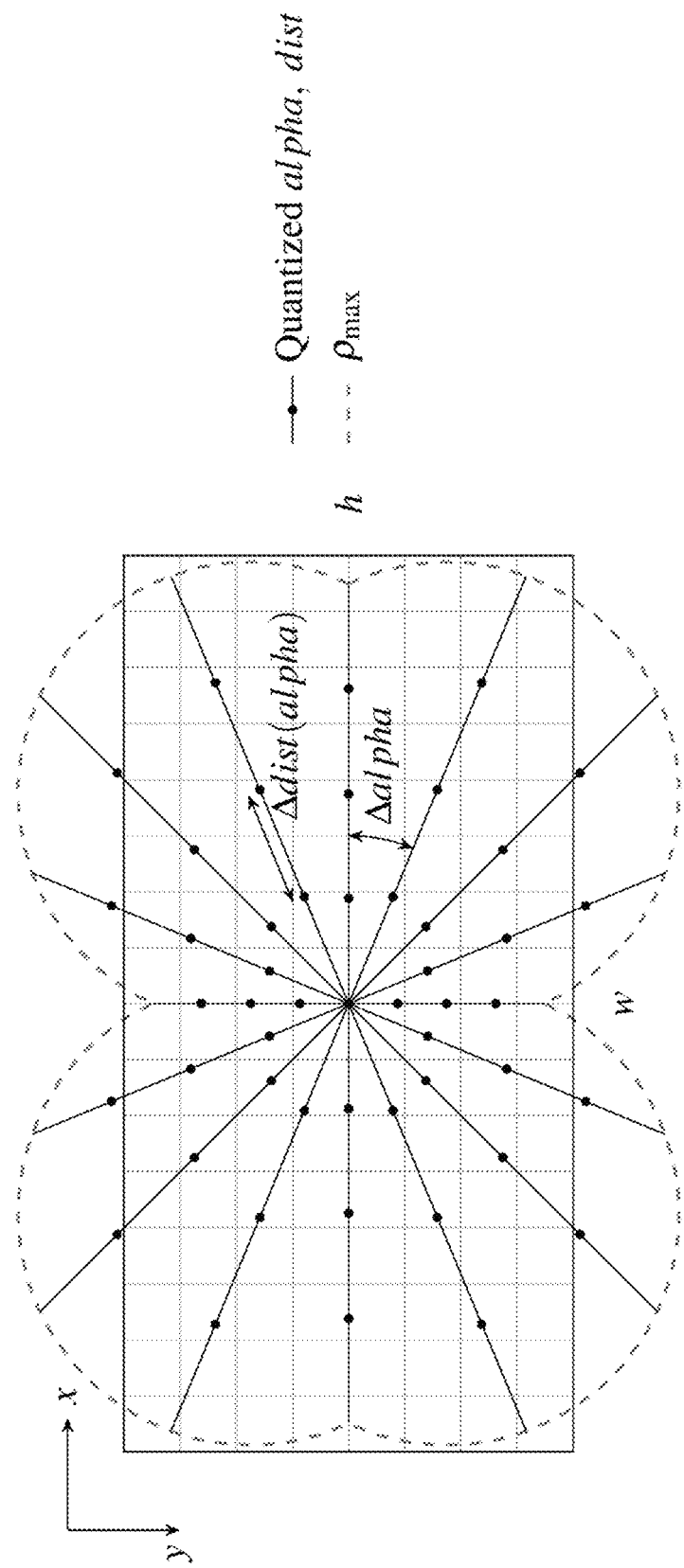
FIG. 16 illustrates an example of a quantization scheme, where a maximum distance $\rho_{max}$ is defined for a given coding block.

In an example, the maximum distance $\rho_{max}$ can be derived as a function, depending on an angle alphaR and the size of a coding block according to:

$$\rho_{max}(alphaR, w, h) = \cos(alphaR)\left(\frac{h}{2\tan\left(\frac{\pi}{2} - alphaR\right)} + \frac{W}{2}\right),$$

$$0 \leq alphaR < \frac{\pi}{2},$$

where alphaR is the angle previously denoted as alpha in terms of radiant units, w is the width and h is the height of the block in terms of luminance samples. In the example, the value of the angle dependent distance quantization step size Δdist(alpha) can be derived as Δdist(alphaR,w,h)=$\rho_{max}$(alphaR,w,h)/N, where N−1 is the maximum value of distanceIdx. This is exemplified in FIG. 16 with values of Δangle=22.5° and N=4.

In another example, the value of the angle dependent distance quantization step size can be derived as Δdist(alphaR,w,h)=($\mu_{max}$(alphaR,w,h)−$\rho_{th}$)/N, where $\rho_{th}$ is a parameter used to modify the spacing between the separation lines for a coding block. In an example, the value of $\rho_{th}$ is set to $\rho_{th}$=1.5.

Figure 17:
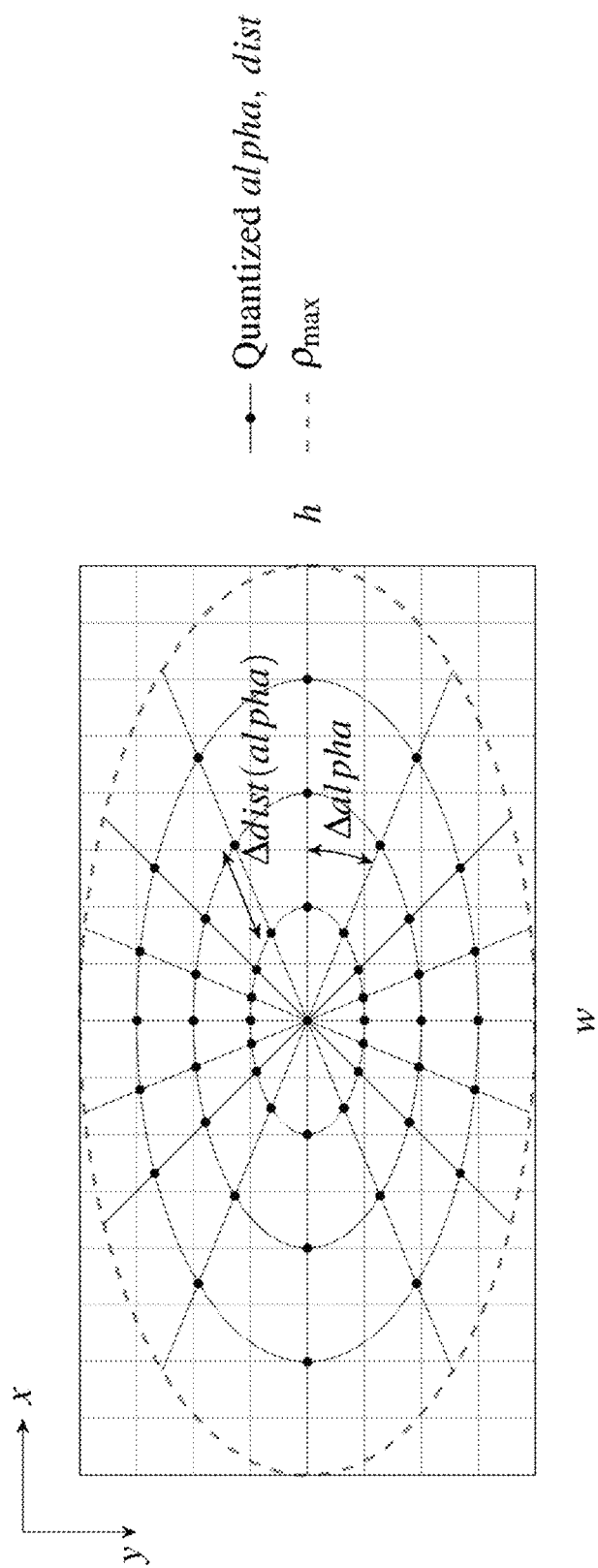
FIG. 17 illustrates an example of a quantization scheme, where an alternative maximum distance $\rho_{max}$ is defined for a given coding block.

In another example, the maximum distance $\rho_{max}$ can be derived as a function, depending on an angle and the size of a coding block according to:

$$\rho_{max}(alphaR, w, h) = \frac{1}{2\sqrt{\left(\frac{\cos(alphaR)}{w}\right)^2 + \left(\frac{\sin(alphaR)}{h}\right)^2}},$$

$$0 \le alphaR < \frac{\pi}{2},$$

where alphaR is the angle in terms of radiant units, w is the width and h is the height of the block in terms of luminance samples. This is exemplified in FIG. 17 with values of Δangle=22.5° and N=4.

In an example values of Δdist are depending on the value of a parameter representing an angle, a parameter representing the width and a parameter representing a height can be stored in a pre-computed look-up table, in order to avoid the repeated computation of the Δdist during the encoding or decoding process.

In an embodiment, values of Δdist can be scaled and rounded, for purposes of using integer arithmetic according to stepD=Round(Δdist*$2^{prec}$), where stepD represents a linearly scaled distance step size and prec is a variable used to adjust the precision of the scaling process. In an example, the value of prec is set to prec=7.

In an example, it is further store pre-computed values of stepD based on an aspect ratio denoted whRatio, which depends on the width and height of a coding block. Further, pre-computed values of stepD is stored based on a (normalized) angle value angleN, which is an index value that relates to angles in the first quadrant of the Euclidean plane (e.g. 0≤angleN*Δalpha≤90°). An example of such a look-up table where the aforementioned simplifications have been applied can be seen in FIG. 13.

In one embodiment, the following steps are applied to obtain prediction values for samples of a coding block.

Step 1: For a sample in a current block (decoding block or encoding block), a sample distance (sample_dist) is calculated.

In some examples, the sample distance may represent the horizontal distance or the vertical distance, or a combination of vertical and horizontal distance, of the said sample to a separation line (the separation line is used to divide a coding block into two subblocks,). The said sample is represented by coordinates (x,y) with respect to the top-left sample of the coding block. The sample coordinate and the sample_dist are exemplified in FIG. 11 and FIG. 12. The subblock is not necessarily rectangular, they might have triangular or trapezoid in shape.

In an example, a first parameter represents a quantized angle value (angleIdx) and a second parameter represents a quantized distance value (distanceIdx). The two parameters describe a line equation. In an example, the distance 1230 can be obtained according to distanceIdx (second parameter), and angle alpha (1210) can be obtained according to angleIdx (first parameter). The distance 1230 can be a distance to the center of a coding block, and the angle can be an angle between the separation line and the horizontal (or equivalently the vertical) line passing through the center point of the coding block.

In an example, in step 1, a coding block is divided into 2 sub-blocks in various ways. FIG. 9 shows an example about partition of a coding block, the separation line 1250 divides the block into 2 subblocks. In order to describe the line 1250, one parameter angle alpha 1210 is signaled in a bitstream.

In some embodiments, the angle, as indicated in FIG. 9, is measured between the x-axis and the separation line, whereas the distance is measured by the length of the vector which is perpendicular to the separation line and passing through the center of the current block.

In another example, FIG. 10 shows an alternative way of representing the separation line, where the examples of the angle and the distance are different with the examples showed in FIG. 9.

Step 2: The calculated sample_dist is used to calculate weighting factors, the weighting factors are used for the combination of a first prediction value and a second prediction value corresponding to the said sample. In an example, the weighting factors are denoted as sampleWeight1 and sampleWeight2, referring to the weight corresponding to the first prediction value and the weight corresponding to the second prediction value.

Step 3: The combined value of the prediction sample at the sample coordinate (x,y) is calculated according to, the first prediction value at coordinate (x,y), the second prediction value at coordinate (x,y), sampleWeight1 and sampleWeight2.

In an embodiment, according to one example, the Step 1 in the above embodiments may comprise the following steps:

Step 1.1: obtain an index value of an angle (alphaN) parameter for the current block, a value of width of the current block (W), a value of height of the current block (H). The W and H are width and height of the current block in number of samples. For example, a coding block with width and height both equal to 8 is a square block that comprises 64 samples. In another example, The W and H are width and height of the current block in number of luma samples.

Step 1.2: obtain a value of a ratio whRatio according to the value of W and the value of H, the value of whRatio represent a ratio between the width and height of the current coding block.

Step 1.3: Obtain a stepD value according to a lookup table, the value of the alpha and the value of the whRatio, in an example, as showed in FIG. 13, the value of the alpha and the value of the whRatio are used as index values of the lookup table.

Step 1.4: a value of the sample_dist is calculated according to the stepD value.

In another embodiment, in an example, the Step 1 in the above embodiments may comprise the following steps:

Step 1.1: obtain a value of an angle (alphaN) parameter for the current block, a value of a distance index (distanceIdx), a value of width of the current block (W), a value of height of the current block (H).

Step 1.2: obtain a value of a ratio whRatio according to the value of W and the value of H, the value of whRatio represent a ratio between the width and height of the current coding block.

Step 1.3: Obtain a stepD value according to a lookup table, the value of the alpha and the value of the whRatio, in an example, as showed in FIG. 13, the value of the alphaN and the value of the whRatio are used as index values of the lookup table. In an example, the stepD value represents a quantization step size for the sample distance calculation process.

Step 1.4: a value of the sample_dist is calculated according to the stepD value, the value of distanceIdx, the value of the angle (alphaN), the value of W and the value of H.

In one example, a value of whRatio is obtained using the formula:

whRatio=(wIdx>=hIdx)?wIdx-hIdx:hIdx-wIdx where a value of wIdx is equal to log 2(W)−3, and a value of hIdx is equal to log 2(H)−3.

In another example, a value of whRatio is calculated as whRatio=(W>=H)? W/H:H/W.

In embodiments of the present disclosure, a value of angle alpha can be obtained from the bitstream (in the decoder). In one example, a value range for the angle is a quantized value range between 0 and 31 (includes 0 and 31) denoted as angleIdx. In one example, a quantized angle value only takes 32 different distinct values (therefore a value between 0-31 is enough to represent which angle value is selected). In another example, a value range of the angle value may be between 0-15, which means that 16 different quantized angle values can be selected. It is noted that in general a value the angle may be an integer value greater can zero.

In one example, a value of alphaN is an index value which is obtained from the bitstream, or a value of alpha is calculated based on a value of an indicator which is obtained from the bitstream. For example, a value of alphaN may be calculated as according to the formula:

alphaN=angleIdx if angleIdx>=0&& angleIdx<=Lim, or alphaN=2*Lim−angleIdx if angleIdx>Lim && angleIdx<=2*Lim, or alphaN=angleIdx−2*Lim if angleIdx>2*Lim && angleIdx<=3*Lim, or alphaN=4*Lim−angleIdx otherwise.

whereas angleIdx is a value of an indicator which is obtained from the bitstream. A value of the angleIdx might be an integer value, a value range for angleIdx is between 0-31 (includes 0 and 31).

In another example the value alphaN can be calculated according to one of the following formula:

alphaN=angleIdx, or alphaN=2*Lim−angleIdx, or alphaN=angleIdx−2*Lim, or alphaN=4*Lim−angleIdx.

In the above formula, Lim is a constant predefined value that is related to the number of quantized angle values. For example, if there are 32 different quantized angle values, the number Lim may be equal to 8 (4*Lim is equal to 32). In another example, Lim can be 4, which corresponds to a total of 16 different quantized angle values.

In one embodiment, a value of the sample_dist is obtained according to the formula:

sample_dist=((2*x)−W+K)*f1(alpha)+((2*y)−H+K)*f2(alpha)−distanceIdx*stepD*scaleStep, where:

f1( ) and f2( ) are functions, and alpha is an input for the functions. In an example, f1( ) and f2( ) are implemented as lookup tables, a value of the alpha is an index value for the lookup tables.
a value of scaleStep is equal to either a value of the width of a coding (decoding or encoding) block or a value of the height of the coding block.
x and y are the coordinates of the said sample with respect to the top-left sample of the coding block.

K is an integer offset value. In an example, a value for K is 1.

In another embodiment, design of GEO partitioning is unified with triangle merge mode (further referred to as TPM). According to the embodiments (shown in FIG. 18, 19, 20, 21, 22), predicted samples for GEO could be obtained by reusing weighted sample prediction process for TPM as a part of a GEO weighting mask. This operation could be performed in the following steps:

Step1. For a current coding block (also referred to as current block), define a size of a subblock, that is smaller than the size of the current coding block; For example, the subblock may extend along two opposing sides of the current block or along two adjacent sides of the current block, but with at least one length of the subblock being smaller than the corresponding length of the side of the current block that coincides with that side of the subblock. Moreover, it is intended that the subblock does not extend over the boundaries of the current block.

Figure 18:
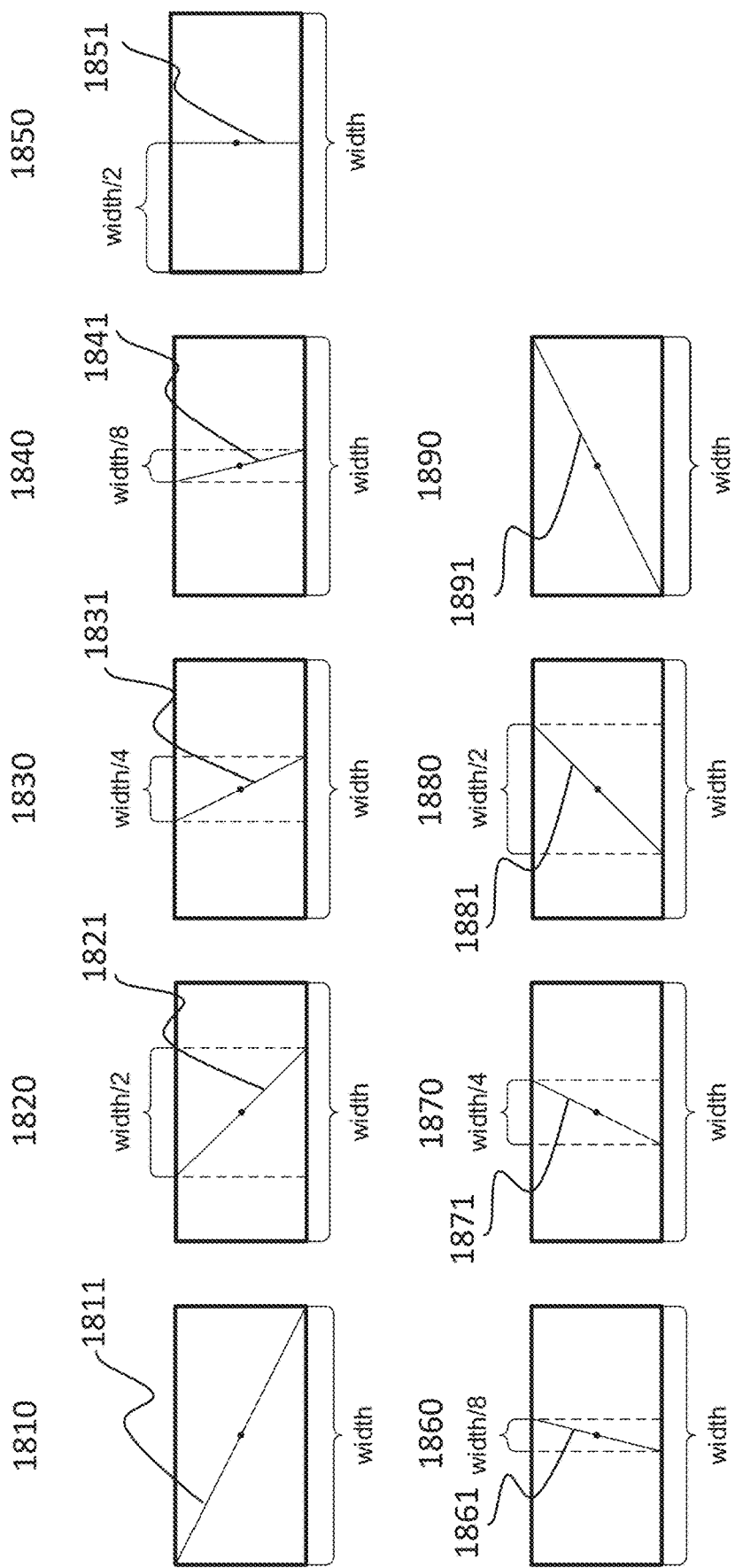
FIG. 18 shows cases when top and bottom sides of the subblock coincide with the top and bottom side of the current block.
Figure 19:
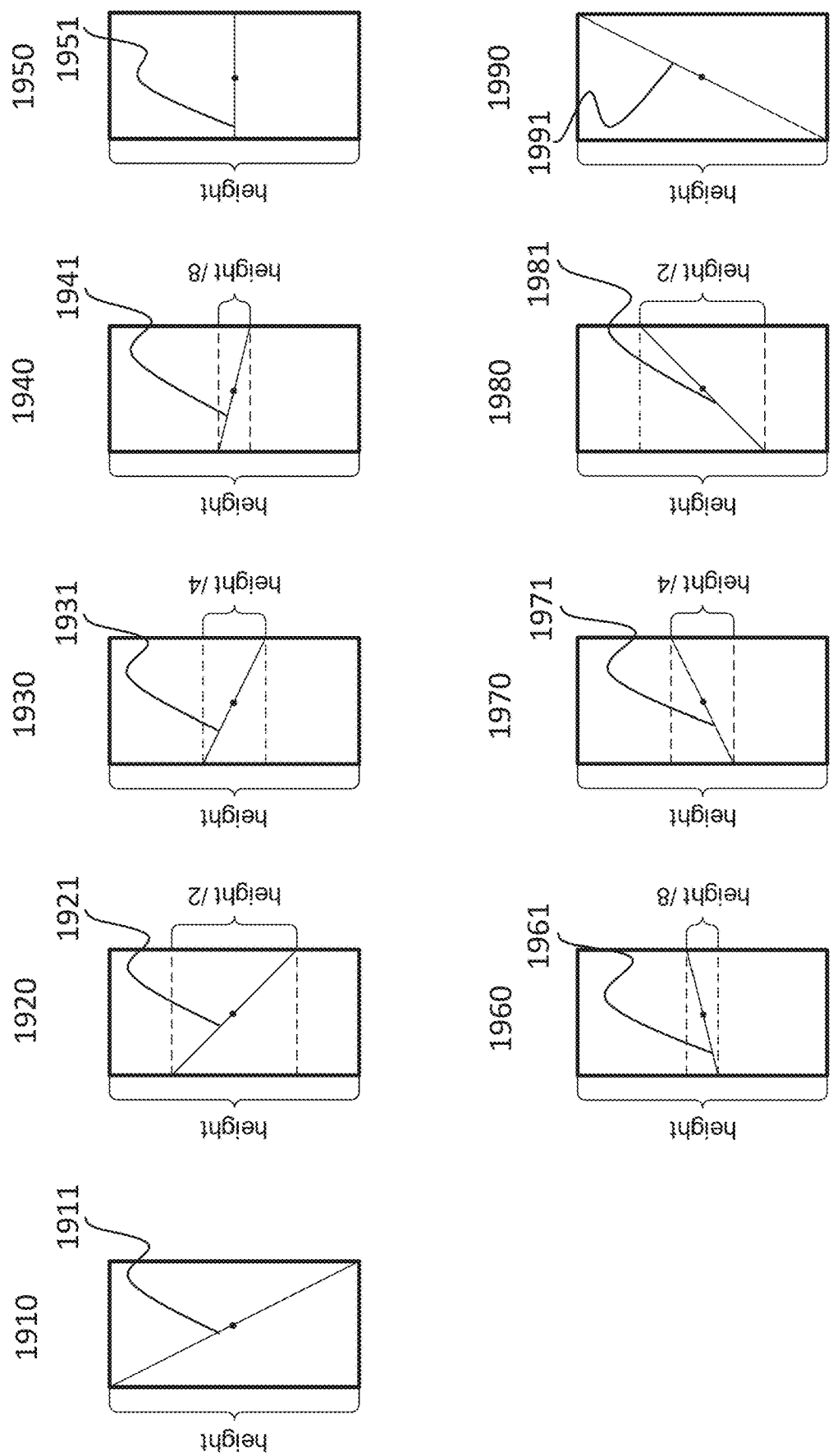
FIG. 19 shows cases when left and right sides of the subblock coincide with the left and right side of the current block.
Figure 20:
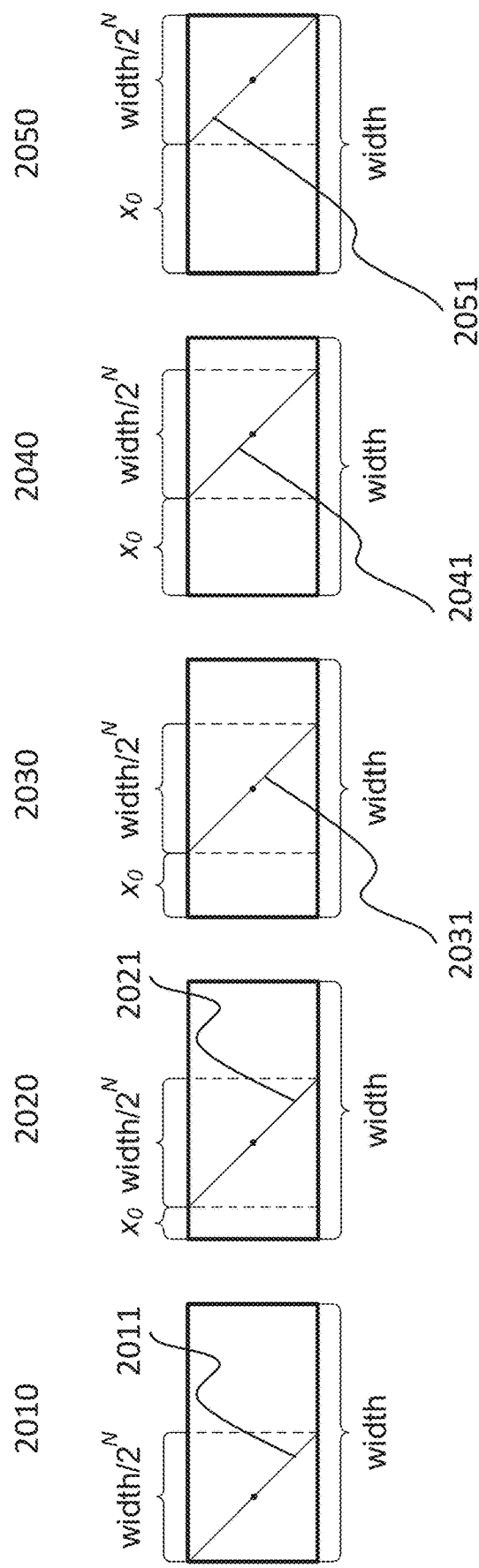
FIG. 20 shows examples of a subblock having its central position not coinciding with the central positions of a current blocks.
Figure 21:
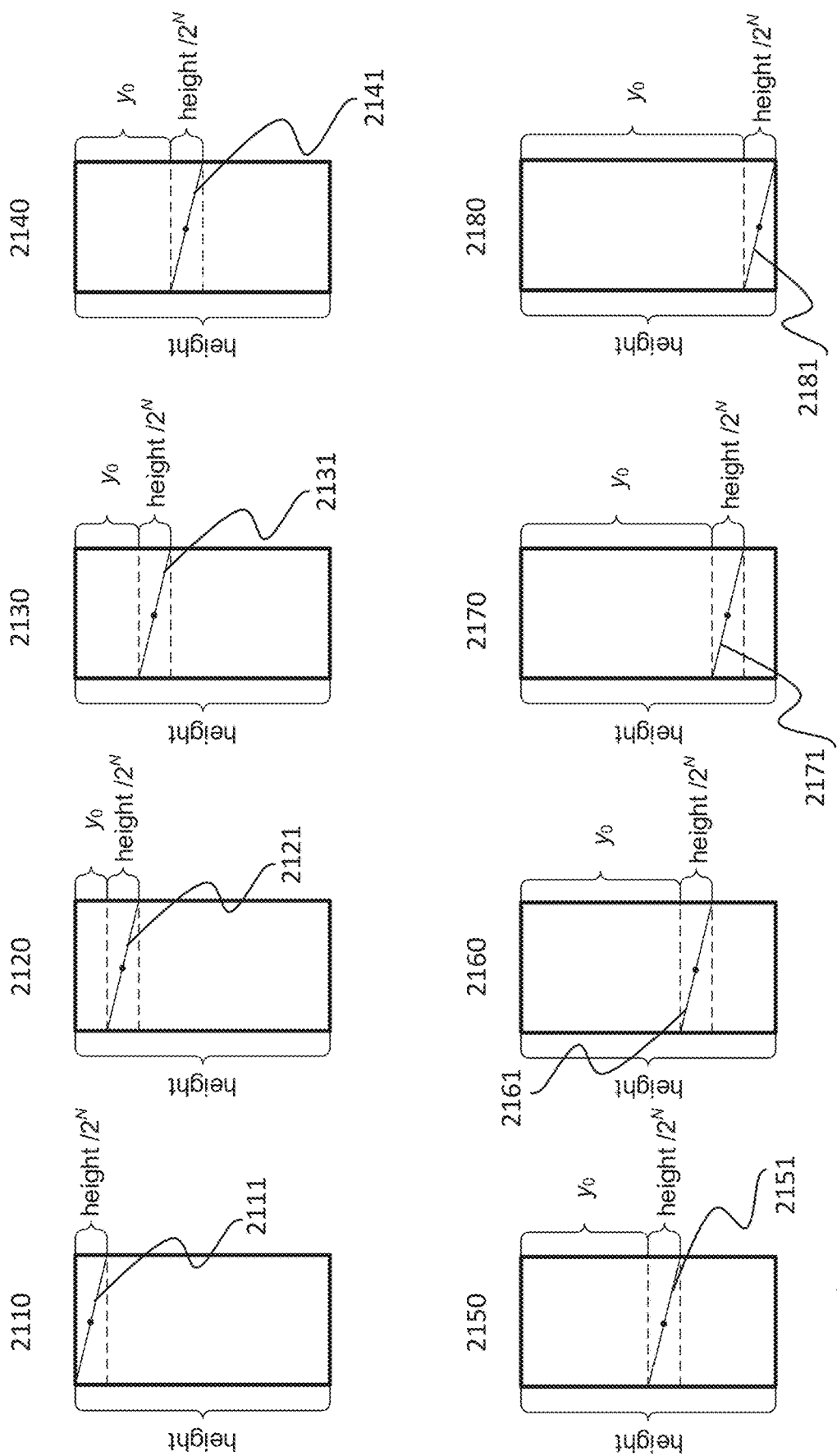
FIG. 21 shows additional examples of a subblock having its central position not coinciding with the central positions of a current blocks.
Figure 22:
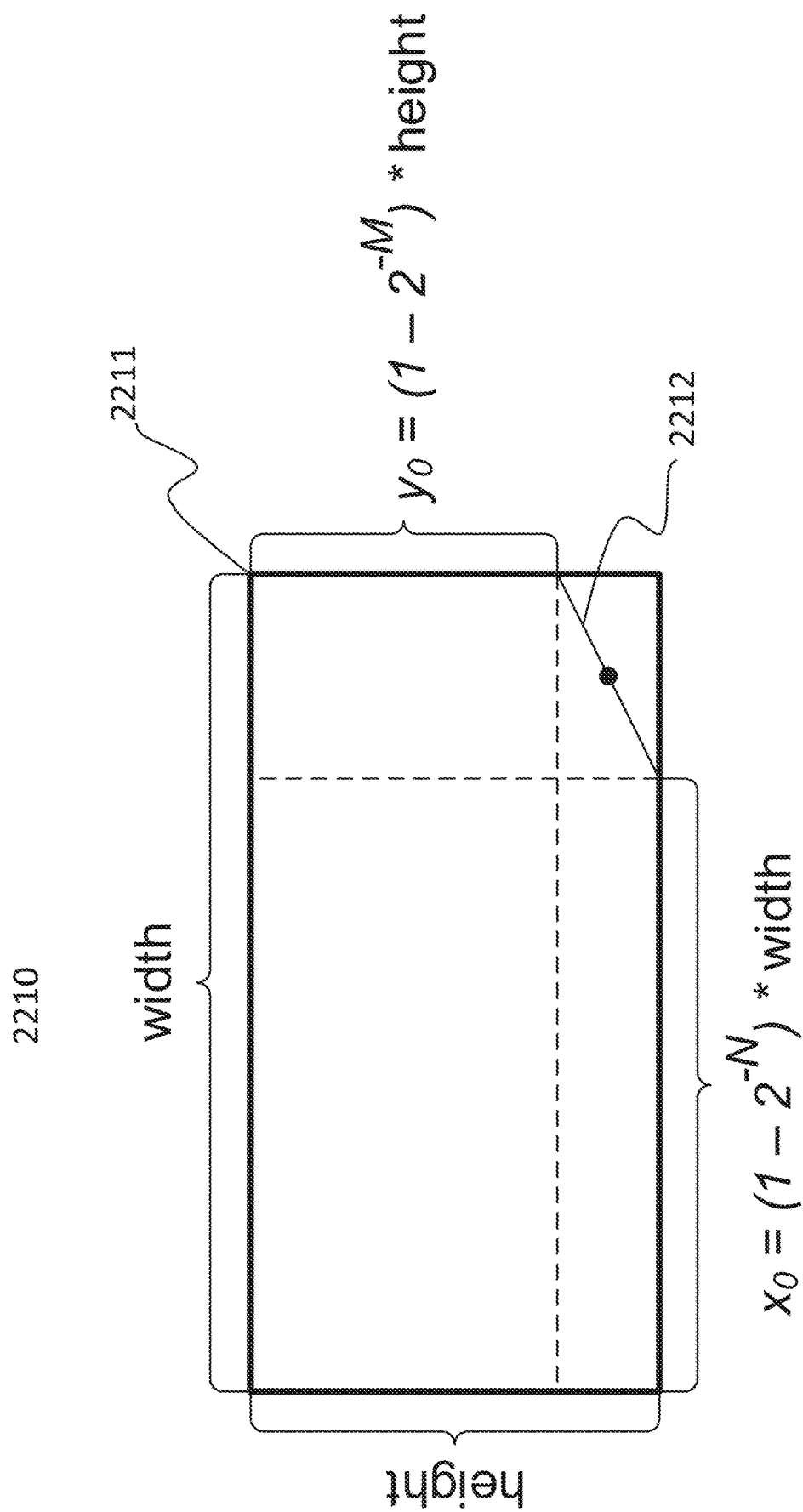
FIG. 22 shows an example of a subblock bottom-right corner coinciding bottom-right corner of the current block.

Step 2. Specify a position of the subblock (shown by a dashed line with the diagonal line between two corners in FIG. 18, 19, 20, 21, 22) within a current coding block, so that two or three sides of a subblock coincide with the sides of a current coding block. Partitioning line (1821, 1831, 1841, 1851, 1861, 1871, 1881, 1891, 1911, 1921, 1931, 1941, 1951, 1961, 1971, 1981, 1991, 2011, 2021, 2031, 2041, 2051, 2111, 2121, 2131, 2141, 2151, 2171, 2181, 2212) defines a set of sample positions that have equal weights for both reference samples. FIG. 18 shows cases when top and bottom sides of the subblock coincide with the top and bottom side of the current block. FIG. 19 shows cases when left and right sides of the subblock coincide with the left and right side of the current block. FIG. 20 and FIG. 21 show examples of a subblock having its central position not coinciding with the central positions of a current block. FIG. 22 shows an example of a subblock bottom-right corner coinciding bottom-right corner of the current block.

Cases 1810, 1890 are degenerate cases, where GEO process is performed in the same way as TPM.

The embodiments described do not depend on a specific arrangement of the subblock with respect to or within the current block. Specifically, the embodiments described here are applicable to subblocks extending between to opposite sides of the current block and to subblocks extending along two adjacent sides of the current block. Further, in cases where the subblock has three sides in common with the current block, the embodiments of the disclosure also apply. Also, a relative shift of the center of the subblock relative to the center of the current block is encompassed. The centers of the current block and the subblock do not need to coincide with each other. Furthermore, the relation between the length and height of the subblock does not need to be the same as the relation between the length and height of the current block.

Step3. Determine allowed split directions of a TPM partitioning for the subblock, depending on which of the sides of the subblock coincide with the sides of the current coding block. In particular, when a partitioning line 2212 intersects two adjacent sides of the current GEO block 2211, only single split direction is allowed. This split direction will then be the split direction extending from the "free ends" of the sides of the subblock that contact at the edge of the current block. In that case, the split direction and the two sides of the subblock that start from the edge of the current block will form a rectangle. For TPM, the split direction necessarily is one of the diagonals of the resulting rectangle, i.e. the subblock. However, as there are two diagonals, also two potential split directions result.

Step4. Obtain predicted samples for the GEO block by using TPM process with the parameters defined in the previous steps. In this process, weight setting can be done as follows:

setting the weights at positions of samples belonging to the subblock area equal to the corresponding weight of the TPM partitioning specified for the subblock; here, also the parameters for GEO as specified for the subblock may be (re)used. For example, an aspect ratio provided for GEO may be applicable to the subblock as well and can therefore be used without having to recalculate it; and in some embodiments setting the weights at positions of samples that do not belong to the subblock area equal to the constant value V, wherein the constant value V depend on the coinciding sides of the current coding block and the subblock splitting direction.

Particularly, to obtain predicted samples for a current (coding) block of GEO prediction mode, the block having width W and height H, a TPM subblock is defined. This TPM subblock may be offset by $(x_0, y_0)$ relative to the position of the block, and this TPM subblock may have the width nCbW and height nCbH, where nCbW and/or nCbH may differ from W and H. For each position (x, y) within the current block, the process of weighted sample prediction process for the GEO prediction mode could be defined as follows.

Inputs to this process are:
two variables W and H specifying the width and the height of the current coding block,
two variables nCbW and nCbH specifying the width and the height of the TPM subblock,
two (W)×(H) arrays predSamplesLA and predSamplesLB,
a variable triangleDir specifying the partition direction, i.e. the split direction selected as mentioned above, for example,
a variable cIdx specifying colour component index.
Two variables x0 and y0 specifying the offset between a specific point of the current block and the subblock, for example of the origins of the coordinate systems. For example, x0 and y0 may specify the offset of a top-left corner of the TPM subblock relative to the top-left corner of the current coding block; it is noted that x0 and y0 may also be both equal to 0 in case the TPM subblock is arranged at the top-left corner of the current block/current coding block.

Output of this process may be the (W)×(H) array pbSamples of prediction sample values.

The variable nCbR may be derived as follows:

$$nCbR=(nCbW>nCbH)?(nCbW/nCbH):(nCbH/nCbW)$$

With this, the aspect ratio nCbR for the subblock is derived from the width nCbW and the height nCbH of the subblock. Thereby, it is not necessary to additionally provide nCbR in the datastream. In cases where the relation between nCbW and nCbH is the same as the relation between W and H of the current block, the aspect ratio nCbR could also be obtained from the respective values of the current block or the aspect ratio provided as GEO parameters could be used in TPM.

The variable bitDepth may be derived as follows:
If cIdx is equal to 0, bitDepth is set equal to $BitDepth_Y$.
Otherwise, bitDepth is set equal to $BitDepth_C$.
Variables shift1 and offset1 are derived as follows:
The variable shift1 is set equal to Max(5, 17−bitDepth).
The variable offset1 is set equal to 1<<(shift1−1).

Depending on the values of triangleDir, wS and cIdx, the prediction samples pbSamples[xS][yS] with xS=0 . . . W−1 and yS=0 . . . H−1 are derived as follows:
The variable x is derived as follows: x=xS−x0
The variable y is derived as follows: y=yS−y0
These calculations take into account the offset of the subblock relative to the current block. xS and yS are the coordinates in the current block and x and y are the coordinates of a point within the subblock in the coordinates of the subblock. In one embodiment, the origin of the coordinate system of the current block may be set to the top left border of the current block for the coordinates of the current block and the origin of the coordinate system of the subblock may be set to the top left border of the subblock. However, this is just but one embodiment. Also other realizations are possible, as long as for the transformation of the coordinates of the origin of the subblock in the coordinate system of the subblock into the coordinates of that origin in the coordinate system of the current block the above equation holds true.

The variable wIdx is derived as follows:
If cIdx is equal to 0 and triangleDir is equal to 0, the following applies:

$$wIdx=(nCbW>nCbH)?(Clip3(0,8,(x/nCbR-y)+4)):(Clip3(0,8,(x-y/nCbR)+4))$$

Otherwise, if cIdx is equal to 0 and triangleDir is equal to 1, the following applies:

$$wIdx=(nCbW>nCbH)?(Clip3(0,8,(nCbH-1-x/nCbR-y)+4))(Clip3(0,8,(nCbW-1-x-y/nCbR)+4))$$

Otherwise, if cIdx is greater than 0 and triangleDir is equal to 0, the following applies:

$$wIdx=(nCbW>nCbH)?(Clip3(0,4,(x/nCbR-y)+2)):(Clip3(0,4,(x-y/nCbR)+2))$$

Otherwise (if cIdx is greater than 0 and triangleDir is equal to 1), the following applies:

$$wIdx=(nCbW>nCbH)?(Clip3(0,4,(nCbH-1-x/nCbR-y)+2))(Clip3(0,4,(nCbW-1-x-y/nCbR)+2))$$

The variable wValue specifying the weight of the prediction sample is derived using wIdx and cIdx as follows:

$$wValue=(cIdx==0)?Clip3(0,8,wIdx):Clip3(0,8,wIdx*2)$$

The prediction sample values are derived as follows:

$$pbSamples[xS][yS]=Clip3(0,(1<<bitDepth)-1,(predSamplesLA[xS][yS]*wValue+predSamplesLB[xS][yS]*(8-wValue)+offset1)>>shift1)$$

Noteworthy, that samples at positions (xS,yS) that do not belong to the subblock, i.e. wherein $xS<x_0$ or $xS>=x_0+nCbW$ or $yS<y_0$ or $yS>=y_0+nCbH$, may all have the same weight wValue, depending on the splitting direction triangleDir and position of the TPM subblock within the PU. These could be set as a constant value V for all wValues at positions outside of the subblock.

The above-described GEO weighting sample prediction process may use the following parameters:
The angular parameter that could be represented in the terms of the TPM subblock as $$\text{angle} = \arctan\left(\frac{nCbH}{nCbW}\right);$$

The width and height of the current block denoted as W and H in the description above with the corresponding ratio value $\frac{W}{H}$;

Sample distance value wIdx that is determined using aspect ratio nCbR. In alternative embodiments the aspect ratio either of a current block $$\left(\text{e.g. } nCbR = \frac{W}{H}\right)$$

or a subblock $$\left(\text{e.g. } nCbR = \frac{nCbH}{nCbW}\right)$$

is used.

Angular parameter could be specified by two factor parameters $F_W$ and $F_H$ that determines the size of the TPM subblock relative to the size of the current subblock:

$$nCbW = \frac{W}{2^{F_W}}; \text{ and } nCbH = \frac{H}{2^{F_H}}.$$

It is noteworthy, that in examples shown in FIG. 20 and FIG. 21 $F_W$ or $F_H$ are nonzero integer values, satisfying:

$$\text{either} \begin{cases} F_W \neq 0 \\ F_H = 0 \\ x_0 \notin \{0, W - nCbW\} \end{cases}, \text{ or } \begin{cases} F_W = 0 \\ F_H \neq 0 \\ y_0 \notin \{0, H - nCbH\} \end{cases}.$$

These constraints represent the cases when two sides of the TPM subblock coincide with the two opposite sides of the current block.

When a subblock corner is coincident with the corner of the current block, e.g. when $x_0 \notin \{0, W-nCbW\}$ and $y_0 \notin \{0, H-nCbH\}$, the following constraints are satisfied: either $$\begin{cases} F_W > 0 \\ F_H = 0 \end{cases}, \text{ or } \begin{cases} F_W = 0 \\ F_H > 0 \end{cases}, \text{ or } \begin{cases} F_W > 0 \\ F_H > 0 \end{cases}.$$

In the following cases, allowed split direction is defined as non-main diagonal of the subblock (triangleDir is allowed to be set only to 1):
when a subblock left side and above side coincide with the left and top side of a current block, e.g. $x_0=0$ and $y_0=0$;
when a subblock right side and bottom side coincide with the right and bottom side of a current block, e.g. $x_0=W-nCbW$ and $y_0=H-nCbH$.

In these cases, as already referred to above, the split direction would go through the edge of the current block. While this would, in principle, be possible, embodiments provide for selecting the respective other diagonal of the subblock for the TPM.

In the following cases, allowed split direction is defined as a main diagonal of the subblock (triangleDir is allowed to be set only to 0):
when a subblock left side and bottom side coincide with the left and bottom side of a current block, e.g. $x_0=0$ and $y_0=H-nCbH$;
when a subblock right side and top side coincide with the right side and top side of a current block, e.g. $x_0=W-nCbW$ and $y_0=0$.

In these cases, which correspond to the respective opposite cases to the selection of the split direction as non-main diagonal, as already referred to above, the split direction would go through the edge of the current block. While this would, in principle, be possible, embodiments provide for selecting the respective other diagonal of the subblock for the TPM.

In an alternative embodiment, the aspect ratio for the subblock may be defined by a block aspect ratio. In this case, for each position (xS, yS) within the block, the process of weighted sample prediction process for the GEO prediction mode could be defined as follows.

Inputs to this process are:
two variables W and H specifying the width and the height of the current coding block,
two variables nCbW and nCbH specifying the width and the height of the TPM subblock,
two (W)×(H) arrays predSamplesLA and predSamplesLB,
a variable triangleDir specifying the partition direction,
a variable cIdx specifying colour component index.
Two variables x0 and y0 specifying the offset of a top-left corner of the TPM subblock relative to the top-left corner of the current coding block Output of this process is the (W)×(H) array pbSamples of prediction sample values.

The variable nCbR is derived as follows:

$nCbR=(W>H)?(W/H):(H/W)$

The variable bitDepth may be derived as follows:
If cIdx is equal to 0, bitDepth is set equal to BitDepth$_Y$.
Otherwise, bitDepth is set equal to BitDepth$_C$.
Variables shift1 and offset1 may be derived as follows:
The variable shift1 is set equal to Max(5, 17−bitDepth).
The variable offset1 may be set equal to 1<<(shift1−1).
Depending on the values of triangleDir, wS and cIdx, the prediction samples pbSamples[xS][yS] with xS=0 . . . W−1 and yS=0 . . . H−1 may be derived as follows:
The variable x is derived as follows: x=xS−x0
The variable y is derived as follows: y=yS−y0
Like above, xS and yS are the coordinates of a point in the coordinate system of the current block and x and y are the coordinates of a point in the coordinate system of the subblock.

The variable wIdx is derived as follows:
If cIdx is equal to 0 and triangleDir is equal to 0, the following applies:

$wIdx=(W>H)?(\text{Clip3}(0,8,(x/nCbR-y)+4)):(\text{Clip3}(0,8,(x-y/nCbR)+4))$

Otherwise, if cIdx is equal to 0 and triangleDir is equal to 1, the following applies:

$wIdx=(W>H)?(\text{Clip3}(0,8,(nCbH-1-x/nCbR-y)+4))(\text{Clip3}(0,8,(nCbW-1-x-y/nCbR)+4))$ Otherwise, if cIdx is greater than 0 and triangleDir is equal to 0, the following applies:

$wIdx=(W>H)?(\text{Clip3}(0,4,(x/nCbR-y)+2)):(\text{Clip3}(0,4,(x-y/nCbR)+2))$

Otherwise (if cIdx is greater than 0 and triangleDir is equal to 1), the following applies:

$wIdx=(W>H)?(\text{Clip3}(0,4,(nCbH-1-x/nCbR-y)+2))(\text{Clip3}(0,4,(nCbW-1-x-y/nCbR)+2))$ The variable wValue specifying the weight of the prediction sample may be derived using wIdx and cIdx as follows:

wValue=(cIdx==0)?Clip3(0,8,wIdx):Clip3(0,8, wIdx*2)

The prediction sample values may be derived as follows:

pbSamples[xS][yS]=Clip3(0,(1<<bitDepth)−1,(predSamplesLA[xS][yS]*wValue+predSamplesLB[xS][yS]*(8−wValue)+offset1)>>shift1).

Figure 23:
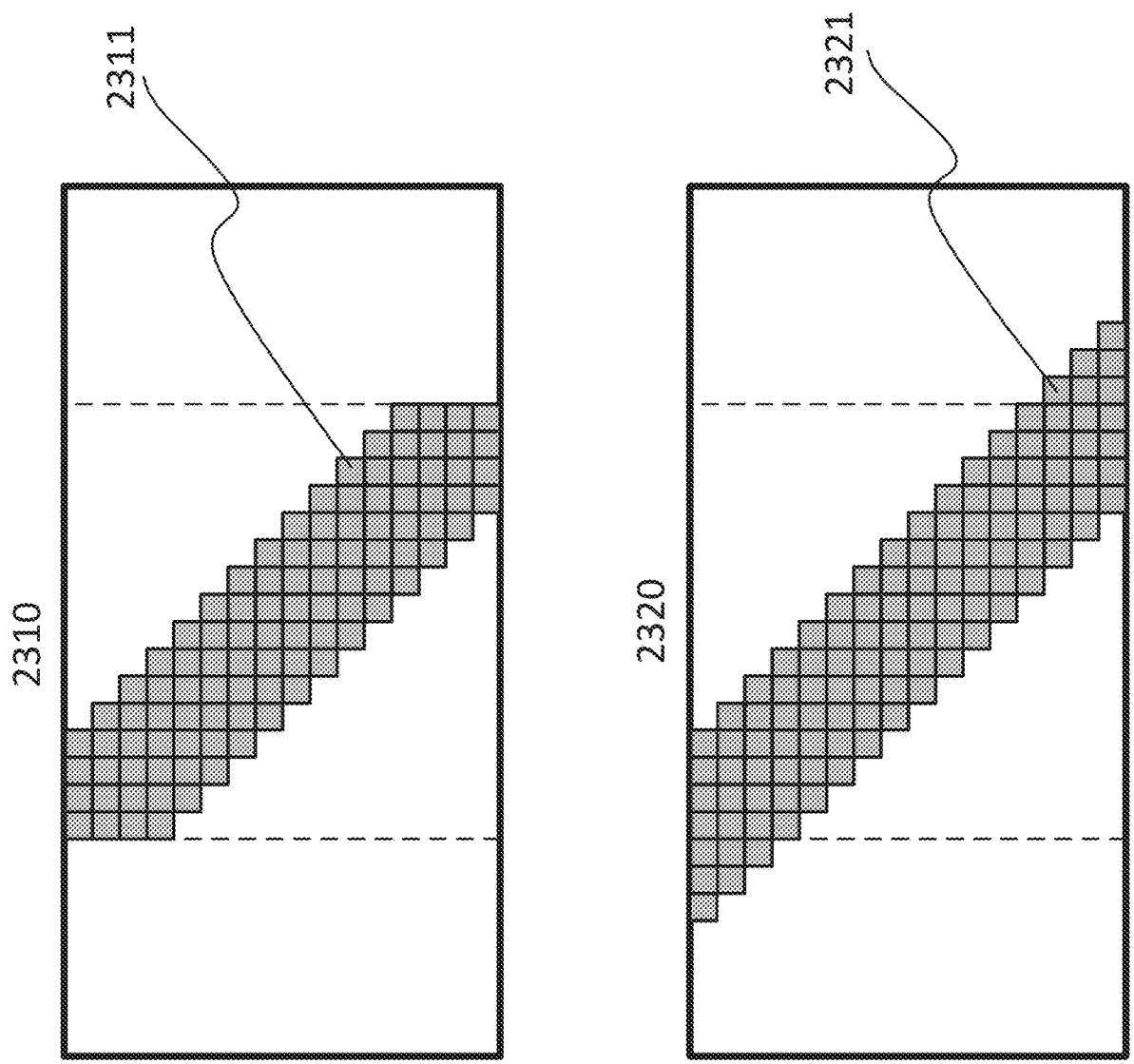
FIG. 23 shows an example of a weighting area restricted by a subblock area.

In some examples, distance parameter calculation wIdx (the first value) could be based on alternative definition of the position of the sample within a current block. In particular, weighting area 2311 could be constraint by the subblock area (shown as case 2310 in FIG. 23):

The variable wIdx may, in that case, be derived as follows:

If x<0 or y<0 the following applies:

wIdx=triangleDir*(cIdx==0?8:4)

Otherwise If x>nCbW or y>nCbH the following applies:

wIdx=(triangleDir==0?1:0)*(cIdx==0?8:4)

Otherwise, if cIdx is equal to 0 and triangleDir is equal to 0, the following applies:

wIdx=(W>H)?(Clip3(0,8,(x/nCbR−y)+4)):(Clip3(0,8,(x−y/nCbR)+4))

Otherwise, if cIdx is equal to 0 and triangleDir is equal to 1, the following applies:

wIdx=(W>H)?(Clip3(0,8,(nCbH−1−x/nCbR−y)+4))(Clip3(0,8,(nCbW−1−x−y/nCbR)+4))

Otherwise, if cIdx is greater than 0 and triangleDir is equal to 0, the following applies:

wIdx=(W>H)?(Clip3(0,4,(x/nCbR−y)+2)):(Clip3(0,4,(x−y/nCbR)+2))

Otherwise (if cIdx is greater than 0 and triangleDir is equal to 1), the following applies:

wIdx=(W>H)?(Clip3(0,4,(nCbH−1−x/nCbR−y)+2))(Clip3(0,4,(nCbW−1−x−y/nCbR)+2))

In terms of angular and distance parameters, the TPM-related embodiment may use the following equation to calculate "sample_dist" value:

sample_dist=((2*x)−W+K)*f1(alpha)+((2*y)−H+K))*f2(alpha)−distanceIdx*stepD*scaleStep.

This equation has the following meaning for its terms:
The "sample_dist" parameter may be represented by wIdx variable;
The value of "distanceIdx" may be set to 0.
Function "f1(alpha)" may be defined equal to "f2(alpha)" and set equal to "1/nCbR", wherein "nCbR" is the aspect ratio for the TPM subblock that in combination with "triangleDir" define angular parameter "alpha", which is a diagonal of the subblock.
The value of "2K" may be set equal to "W+H−x−2y".
"distanceIdx*stepD*scaleStep" is set equal to 4−y.

In one embodiment, functions f1( ) and f2( ) are implemented as lookup tables. In an example, functions f1( ) and f2( ) represent an incremental change in the sample_dist value with respect to changing x and y values. In some examples, f1(index) represents the sample_dist value is changed with one unit increase in the value of x (unit might be increase is equal to 1), whereas the f2(index) represents the sample_dist value is changed with one unit increase in the value of y. A value of the index can be obtained from a value of an indicator in a bitstream.

In another embodiment, a value of sample_dist is obtained according to the formula:

sample_dist=((2*x)−W+K)*f(dispIdxN)+((2*y)−H+K))*f(dispIdxS)−distanceIdx*stepD*scaleStep, where:

f( ) is a function, in an example, function f( ) is implemented as a lookup table (LUT). It can, for the block to be predicted, i.e. the current block, be provided in a header of the slice to which the current block belongs or in any other suitable way. Pointers can be provided point to an entry in the look-up table (LUT) that indicates a value of the respective function f( ).

dispIdxN or dispIdxS are index values that may be obtained from a bitstream or may be calculated based on a value of an indicator in the bitstream.

a value of scaleStep is equal to either a value of the width of a coding (decoding or encoding) block or a value of the height of the coding block.

x and y are the coordinates of the said sample with respect to the top-left sample of the coding block (or current block).

K is an integer offset value. In an example, a value for K is 1.

In an embodiment, function f( ) is implemented as a lookup table, as already mentioned above. Function f( ) represents an incremental change in the sample_dist value with respect to changing x and y values. In an example, f(index1) represents the sample_dist value is changed with one unit increase in the value of x, whereas the f(index2) represents the sample_dist value is changed with one unit increase in the value of y. The values of the index1 and index2 may be indexes to the lookup table (having an integer value greater than or equal to 0), that can be obtained according to a value of an indicator in a bitstream.

In an example, implementation of function f( ) is illustrated in FIG. 14. In this example, a value of the idx is the input parameter (which may be index1 or index2), and the output of the function is illustrated as f(idx). In an example, the f( ) is an implementation of a cosine function using integer arithmetic, where the idx (input index value) may represent a quantized angle value.

In one embodiment, a stepD value represents a quantized distance value for the sample distance calculation.

In one embodiment, as showed in FIG. 13, a stepD value is obtained according to a value of whRatio and a value of angle (alpha). In an example, a value of stepD can be obtained as stepD=lookupTable[alphaN][whRatio], where a value of alphaN is an index value that is obtained from the bitstream, or a value of alphaN is calculated based on a value of an indicator that is obtained from the bitstream. For example, alpha can be calculated as according to the formula:

alphaN=angleIdx if angleIdx>=0&& angleIdx<=8, or alphaN=16−angleIdx if angleIdx>8&& angleIdx<=16, or alphaN=angleIdx−16 if angleIdx>16&& angleIdx<=24, or alphaN=32−angleIdx otherwise, where angleIdx is an index value that is obtained according to a bitstream.

In another example:

alpha$N$=angle$Idx$ if angle$Idx$>=0 && angle$Idx$<=Lim, or alpha$N$=2*Lim−angle$Idx$ if angle$Idx$>Lim && angle$Idx$<=2*Lim, or alpha$N$=angle$Idx$−2*Lim if angle$Idx$>2*Lim && angle$Idx$<=3*Lim, or alpha$N$=4*Lim−angle$Idx$ otherwise.

Or in another example:

alpha$N$=angle$Idx$, or alpha$N$=2*Lim−angle$Idx$, or alpha$N$=angle$Idx$−2*Lim, or alpha$N$=4*Lim−angle$Idx$ In the above formula Lim is a constant predefined value that is related to the number of quantized angle values. For example, if there are 32 different quantized angle values, then the number Lim may be equal to 8 (4*Lim is equal to 32). In another example Lim can be 4, which corresponds to a total of 16 different quantized angle values.

In some embodiments, the value of the angle, specifically tan(alphaN) may also be obtained from an LUT. Specifically, in cases where the height of the subblock, nCbH, and the width of the subblock, nCbW, are provided as power-of-2-values, this can be the case. In such a case, nCbH may be $2^p$ and nCbW may be $2^q$. Then, tan(alphaN)=$2^{p-q}$ or $2^{q-p}$, depending on the split direction. In such a case, alphaN will only assume discrete, quantized values, depending only on p and q. In some embodiments, a LUT for tan(alphaN) or alphaN can be provided from which the value tan(alphaN) or alphaN, respectively, can be fetched. P and q will then act as indices that can be obtained from the size of the subblock.

In one example, a value of the sample_dist is obtained according to distanceIdx*stepD*scaleStep, where distanceIdx is an index value that is obtained according to a bitstream, and a value of scaleStep is obtained according to either a value of width of the block or a value of height of the block. The result of the multiplication represents a distance of the separation line to the center point of the coding block (which has coordinates x=W/2 and y=H/2).

In an example, the lookup table is a predefined table. The predefined table has the following advantages:

Obtaining the distance of a sample to a separation line is usually complex, it requires solving trigonometric equations which is not acceptable when implementing a video coding standard, which targets mass produced consumer products.

In some embodiments, the sample distance is obtained according to a lookup table (which may be predefined), which pre-calculated intermediate results according to whRatio and alpha, which already follow an integer arithmetic. In one example, this can comprise that all stepD values are integer values. This has several advantages:

The lookup table comprises the intermediate calculation results for complex operations (trigonometric calculations). These calculations do thus not need to be performed by, for example, the decoder or the encoder. This reduces the computational complexity and, therefore, the implementation complexity.

The size of the table is kept small, reducing the size of the encoded datastream and the amount of data that has to be processed by the decoder and/or the encoder, thereby saving at least memory and potentially also processing capacity.

In another example, a value of the sample_dist is obtained according to distanceIdx*(stepD+T)*scaleStep, where T is an offset value which has an integer value. In an example, a value of T is 32.

Figure 24:
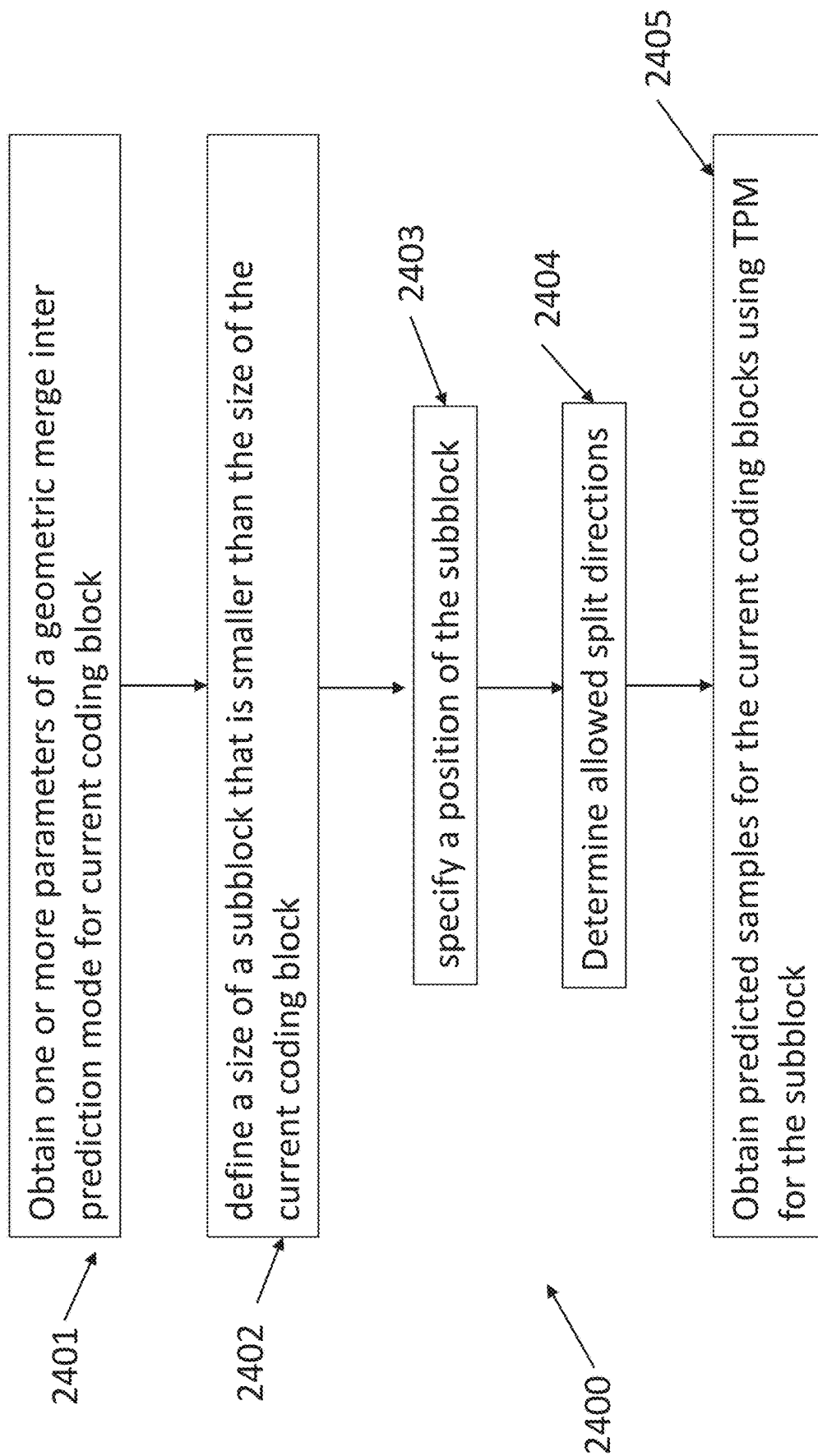
FIG. 24 shows a schematic flow diagram of a method according to one embodiment.

FIG. 24 provides a (simplified) flow diagram of a method 2400 of inter prediction for a current block of a video sequence according to one embodiment. It is noted that this flow diagram does not include all potential steps and/or substeps that may form part of the method. Specifically, the method shown in the flow diagram of FIG. 24 may be further combined with any of the embodiments described above.

In the flow diagram of FIG. 24, the method 2400 of interprediction for a current block of a video sequence comprises:

obtain one or more parameters of a geometric merge, GEO, inter prediction mode for a current coding block (2401)

define a size of a subblock (2402). The size of the subblock is, according to embodiments, smaller than the size of the current coding block. Specifically, the size of the subblock may be smaller than the size of the current coding block in at least one dimension specify (2403) a position of the subblock within the current coding block. This position may be specified so that either two or three sides of the subblock coincide with the sides of the current coding block determine (2404) one or more allowed split directions of a triangle partitioning mode, TPM, for the subblock. These allowed split directions may depend on which of the sides of the subblock coincide with the sides of the current coding block obtain (2405) one or more predicted samples for the current coding block by using the TPM partitioning performed for the subblock. This obtaining 2405 may specifically be in accordance with the size of the subblock, the position of the subblock within the current coding block and the TPM split direction of the subblock.

By applying this method, an encoder can encode a video sequence with the predicted samples. Likewise, a decoder obtaining an encoded video sequence can decode the sequence by performing the respective prediction using the above method and the information encoded in the encoded video sequence.

Figure 25:
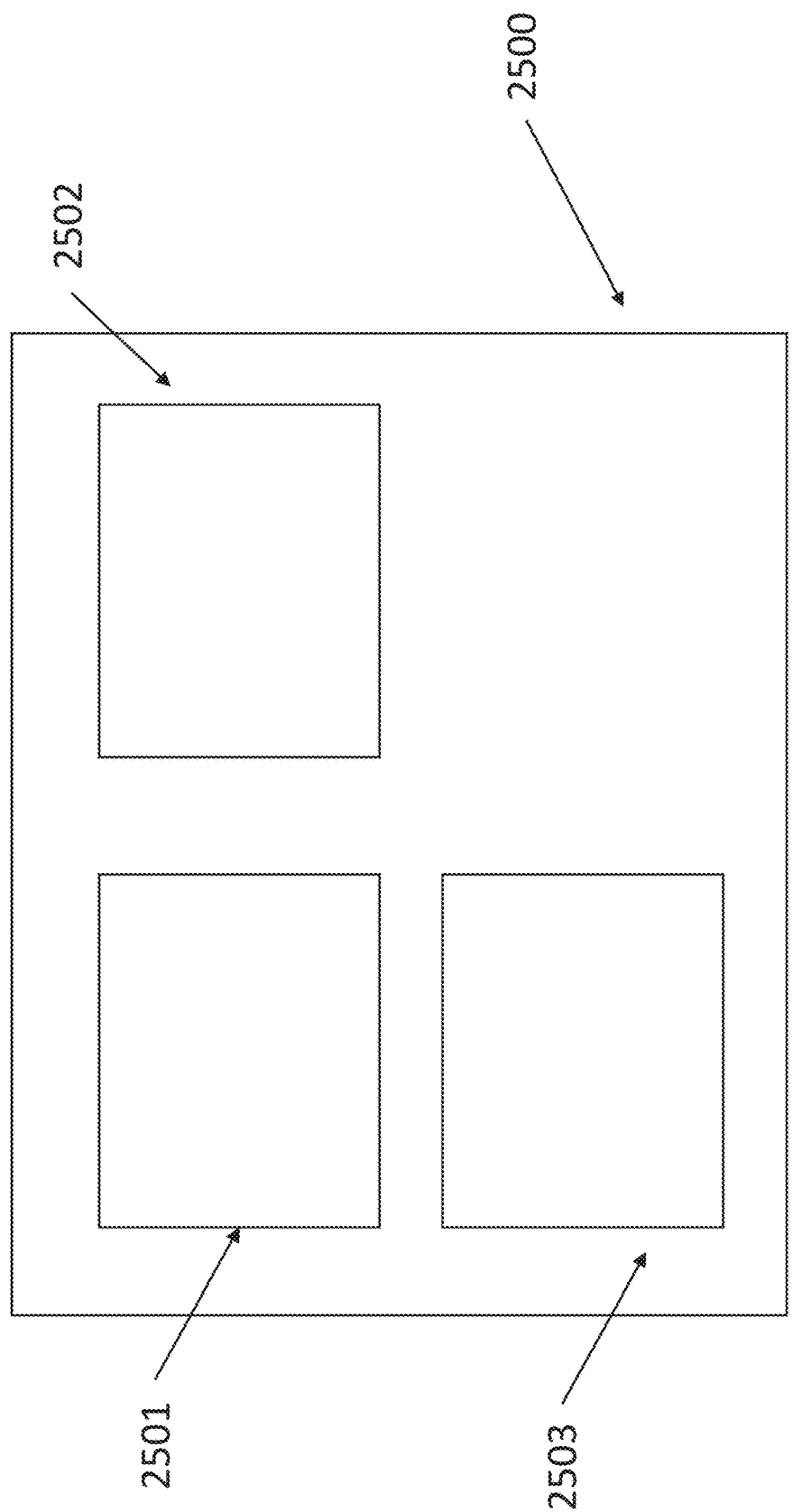
FIG. 25 shows a schematic depiction of an embodiment of an encoder for performing an encoding using the method according to the embodiment of FIG. 24.

FIG. 25 shows an encoder 2500 according to one embodiment. The encoder 2500 is shown here schematically only. It may be implemented by hardware or software or both, as explained already above. Further, the components shown in FIG. 25 are not intended to limit the number and/or kind of components of the encoder. Specifically, the encoder may include further components, like those referred to above, specifically with respect to FIGS. 1 to 3.

According to the embodiments shown in FIG. 25, the encoder comprises:

a deriving unit 2501, a prediction unit 2502 and an encoding unit 2503. These units are provided as follows:

The deriving unit 2501, in this embodiment, is adapted to obtain one or more parameters of a geometric merge, GEO, inter prediction mode for a current coding block of the video sequence.

The prediction unit 2502 is adapted to define a size of a subblock that is smaller than the size of the current coding block. Furthermore, the prediction unit 2502 is adapted to specify a position of the subblock within the current coding block, so that either two or three sides of the subblock coincide with the sides of the current coding block and to determine one or more allowed split directions of a triangle partitioning mode, TPM, for the subblock depending on which of the sides of the subblock coincide with the sides of the current coding block. Furthermore, the prediction unit 2502 is adapted to obtain one or more predicted samples for the current coding block by using the TPM partitioning performed for the subblock in accordance with the size of the subblock, the position of the subblock within the current coding block and the TPM split direction of the subblock.

The encoding unit 2503 is adapted to encode at least the current block of the video sequence using at least the one or more predicted samples.

Figure 26:
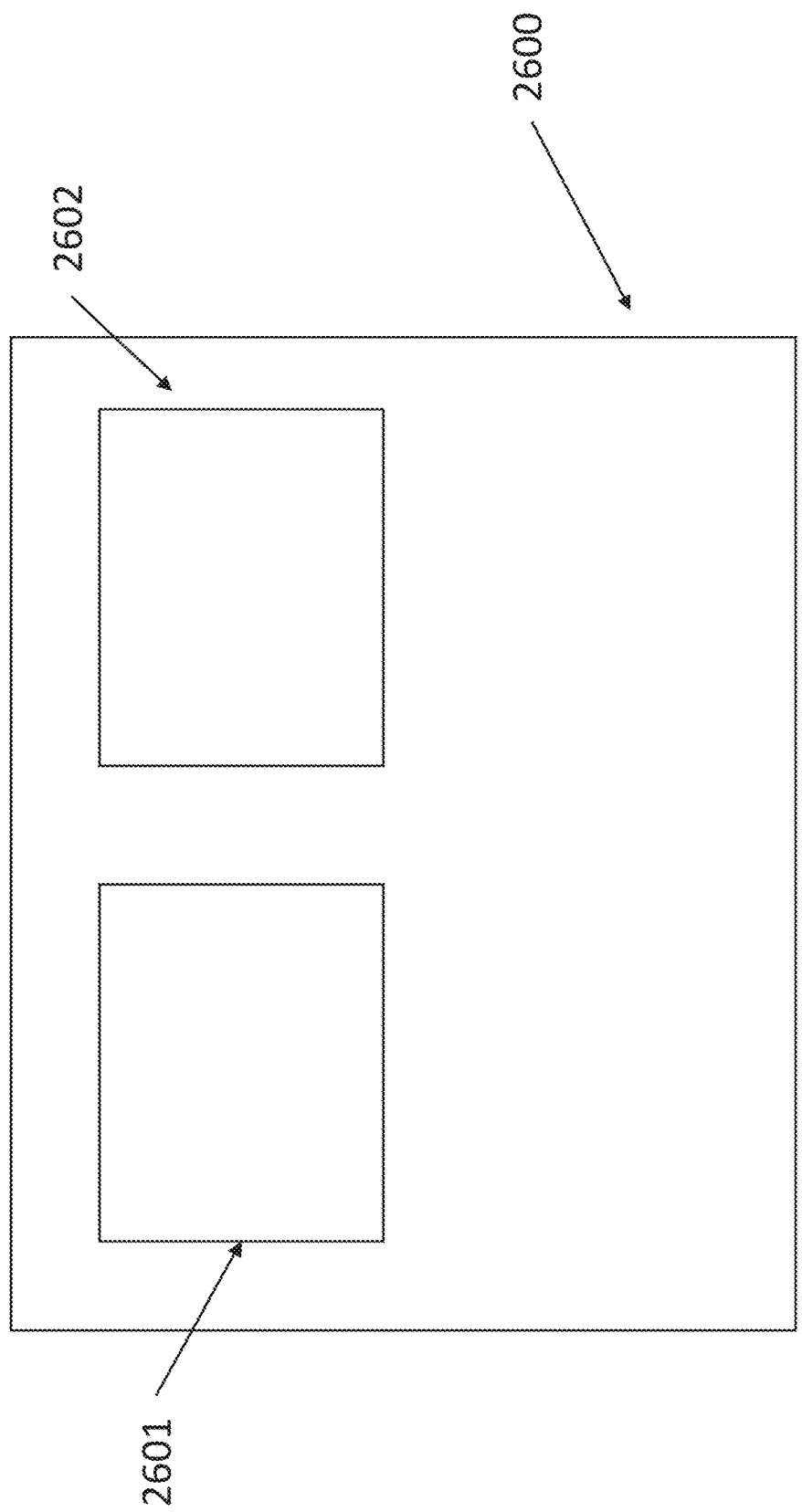
FIG. 26 shows a schematic depiction of an embodiment of a decoder for performing a decoding using the method according to the embodiment of FIG. 24.

FIG. 26 shows a decoder 2600 according to one embodiment. The decoder 2600 is shown here schematically only. It may be implemented by hardware or software or both, as explained already above. Further, the components shown in FIG. 26 are not intended to limit the number and/or kind of components of the decoder. Specifically, the decoder may include further components, like those referred to above, specifically with respect to FIGS. 1 to 3.

In the embodiment of FIG. 26, the decoder comprises a receiving unit 2601 and a decoding unit 2602.

The receiving unit 2602 is adapted to receive the encoded video sequence, the encoded video sequence.

The decoding unit 2602 is adapted to obtain, from the encoded video sequence, one or more parameters of a geometric merge, GEO, inter prediction mode for a current coding block of the video sequence. Furthermore, the decoding unit is adapted to obtain, from the encoded video sequence, a size of a subblock that is smaller than the size of the current coding block and to specify a position of the subblock within the current coding block, so that either two or three sides of the subblock coincide with the sides of the current coding block.

Moreover, the decoding unit 2602 is adapted to determine one or more allowed split directions of a triangle partitioning mode, TPM, for the subblock depending on which of the sides of the subblock coincide with the sides of the current coding block and to obtain one or more predicted samples for the current coding block by using the TPM partitioning performed for the subblock in accordance with the size of the subblock, the position of the subblock within the current coding block and the TPM split direction of the subblock.

Moreover, the decoding unit 2602 is adapted to decode at least the current block of the encoded video sequence using at least the one or more predicted samples.

Several further example embodiments of the disclosure are provided below.

Example 1. A method of coding implemented by a decoding device or encoding device, the method comprising:
  obtaining a value of angular parameter for a current block;
  obtaining a value of width of the current block and a value of height of the current block;
  calculating a ratio value between the value of the width and the value of height;
  obtaining a first value according to the value of angular parameter and the ratio value;
  calculating a sample distance value for a sample in the current block according to the first value;
  obtaining a prediction value for the sample in the current block according to the sample distance value.

Example 2. The method of example 1, wherein the first value is obtained according to a predefined lookup table, the value of angular parameter and the ratio value are used as an index value for the predefined lookup table.

Example 3. The method of example 2, wherein the predefined lookup table comprises 9 different angular values (0 to 8).

Example 4. The method of example 2, wherein the predefined lookup table comprises 5 different angular values (0 to 4).

Example 5. The method of any one of examples 2 to 4, wherein the predefined lookup table comprises 4 different ratio values (0 to 3).

Example 6. The method of any one of examples 2 to 4, wherein the predefined lookup table comprises 5 different ratio values (0 to 4).

Example 7. The method of any one of examples 2 to 4, wherein the predefined lookup table comprises 3 different ratio values (0 to 2).

Example 8. The method of any one of examples 2 to 7, wherein the predefined lookup table comprises a first value corresponding to each combination of angular values and ratio values.

Example 9. The method of any one of examples 1 to 8, wherein the calculating a sample distance value for a sample in the current block according to the first value, comprises:
  calculating the sample distance value for the sample in the current block according to the first value and the value of the angular parameter.

Example 10. The method of any one of examples 1 to 9, wherein the ratio value is obtained according to, $$whRatio = (wIdx >= hIdx)\,?\,wIdx - hIdx : hIdx - wIdx,$$

where whRatio is the ratio value, W is the value of the width, H is the value of the height, a value of wIdx is equal to log 2(W)−3, and a value of hIdx is equal to log 2(H)−3.

Example 11. The method of any one of examples 1 to 9, wherein the ratio value is obtained according to, $$whRatio = (W >= H)\,?\,W/H : H/W,$$

wherein whRatio is the ratio value, W is the value of the width, H is the value of the height.

Example 12. The method of any one of examples 1 to 11, wherein the sample distance value is calculated according to, $$sample\_dist = ((2*x) - W + K)*f1(alpha) + ((2*y) - H + K))*f2(alpha) - distanceIdx*stepD*scaleStep,$$

where sample_dist is the sample distance value, f1( ) and f2( ) are functions, and alpha is the value angular parameter (In an example, f1( ) and f2( ) are implemented as lookup tables, a value of the alpha is an index value for the lookup tables); a value of scaleStep is equal to either the value of the width or the value of the height; x and y are the coordinates of the sample with respect to the top-left sample of the current block; and K is an integer offset value.

Example 13. The method of any one of examples 1 to 11, wherein the sample distance value is calculated according to, $$sample\_dist = ((2*x) - W + K)*f(dispIdxN) + ((2*y) - H + K))*f(dispIdxS) - distanceIdx*stepD*scaleStep,$$

where sample_dist is the sample distance value, f( ) is a function (in an example, function f( ) is implemented as a lookup table), dispIdxN or dispIdxS are index values (in an example, dispIdxN or dispIdxS are obtained from a bitstream or are calculated based on a value of an indicator in the bitstream), a value of scaleStep is equal to either the value of the width or the value of the height, x and y are the coordinates of the sample with respect to the top-left sample of the current block, K is an integer offset value (In an example, a value for K is 1).

Example 14. A decoder (30) or an encoder comprising processing circuitry for carrying out the method according to any one of examples 1 to 13.

Example 15. A computer program product comprising a program code for performing the method according to any one of examples 1 to 13.

Example 16. A decoder or an encoder, comprising:
one or more processors; and
a non-transitory computer-readable storage medium coupled to the processors and storing programming for execution by the processors, wherein the programming, when executed by the processors, configures the decoder to carry out the method according to any one of examples 1 to 13.

Though the description above makes use of the programming language C or provides programming code in C-language, this is, in at least some embodiments, not binding to the disclosure. Indeed, in some embodiments, the disclosure may be implemented using other programming language and/or other programming tools and/or other software modules than the ones described above and below.

In this sense, the use of C-language or C program code may, in some embodiments, be rather considered as pseudo-code, reflecting what, according to embodiments of the disclosure, happens, but not restricting the disclosure to the application of a specific programming code. Rather, embodiments may make use of the actual functions described above, independent from any specific implementation in program code and/or use of a specific programming language.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used in denote division in mathematical equations where no truncation or rounding is intended.

$$\sum_{i=x}^{y} f(i)$$

The summation or f(i) with i taking all integer values from x up to and including y.
x % y Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \,\&\&\, y >= 0 \\ \text{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Round}(x) = \text{Sign}(x) * \text{Floor}(\text{Abs}(x) + 0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians $$\text{Sqrt}(x) = \sqrt{x}$$

Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x− −" |
| "!x", "−x" (as a unary prefix operator) $x^y$ |
| "x * y", "x / y", "x ÷ y", "$\frac{x}{y}$", "x % y" |
| "x + y", "x − y" (as a two-argument operator), "$\sum_{i=x}^{y} f(i)$" |
| "x << y", "x >> y" |
| "x < y", "x <= y", "x > y", "x >= y" |
| "x == y", "x != y" |
| "x & y" |
| "x \| y" |
| "x && y" |
| "x \|\| y" |
| "x ? y : z" |
| "x..y" |
| "x = y", "x += y", "x −= y" |

Text Description of Logical Operations

In the text, a statement of logical operations as would be described mathematically in the following form:

if(condition 0)
  statement 0
else if(condition 1)
  statement 1
. . .
else /* informative remark on remaining condition */
  statement n may be described in the following manner:

. . . as follows/ . . . the following applies:
  If condition 0, statement 0

Otherwise, if condition 1, statement 1
. . .
Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:
if(condition 0a && condition 0b)
    statement 0
else if(condition 1a||condition 1b)
    statement 1
. . .
else
    statement n
may be described in the following manner:
    . . . as follows/ . . . the following applies:
        If all of the following conditions are true, statement 0:
            condition 0a
            condition 0b
        Otherwise, if one or more of the following conditions are true, statement 1:
            condition 1a
            condition 1b
            . . .
        Otherwise, statement n In the text, a statement of logical operations as would be described mathematically in the following form:
if(condition 0)
    statement 0
if(condition 1)
    statement 1
may be described in the following manner:
    When condition 0, statement 0
    When condition 1, statement 1.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter operative hardware units, including one or more processors as described above, in conjunction with suitable software and/or firmware.

What is claimed is:

1. A computer-implemented method of inter-prediction, the method comprising:
   obtaining one or more parameters of a geometric merge (GEO) inter prediction mode for a current coding block;
   defining a size of a subblock that is smaller than a size of the current coding block;
   specifying a position of the subblock within the current coding block, so that either two or three sides of the subblock coincide with sides of the current coding block;
   determining one or more allowed split directions of a triangle partitioning mode (TPM) for the subblock depending on which of the sides of the subblock coincide with the sides of the current coding block; and
   obtaining one or more predicted samples for the current coding block by using the TPM partitioning performed for the subblock in accordance with the size of the subblock, the position of the subblock within the current coding block and a TPM split direction of the subblock.

2. The computer-implemented method according to claim 1, wherein obtaining the one or more predicted samples further comprises:
   setting weights at positions of samples belonging to a subblock area equal to a corresponding weight of the TPM partitioning specified for the subblock; and
   setting the weights at positions of samples that do not belong to a subblock area equal to a constant value V.

3. The computer-implemented method according to claim 2, wherein the constant value V depends on the coinciding sides of the current coding block and the subblock and the subblock split direction.

4. The computer-implemented method according to claim 1, wherein, after determining the one or more allowed split directions and before obtaining the one or more predicted samples, the method further comprises selecting one of the allowed split directions as a split direction for obtaining the one or more predicted samples.

5. The computer-implemented method according to claim 4, wherein the selecting comprises determining whether there is more than one allowed split direction and, if there is more than one allowed split direction, selecting one of the allowed split directions for obtaining the one or more predicted samples.

6. The computer-implemented method according to claim 1, wherein the one or more parameters of the GEO inter prediction mode comprise at least one of: an angle parameter, a width W and/or a height H of the current coding block, or a sample distance value that is determined using an aspect ratio, nCbR.

7. The computer-implemented method according to claim 6, wherein the aspect ratio is determined from dimensions of the current coding block by $$nCbR = \frac{W}{H}.$$

8. The computer-implemented method according to claim 6, wherein the aspect ratio is determined from dimensions of the subblock, $$nCbR = \frac{nCbH}{nCbW},$$

wherein nCbH is a height of the subblock and nCbW is a width of the subblock.

9. The computer-implemented method according to claim 8, wherein the height of the subblock nCbH=$2^p$ pixels and the width of the subblock nCbW=$2^q$ pixels, with q, p∈N.

10. The computer-implemented method according to claim 1, wherein two opposite sides of the subblock coincide with two opposite sides of the current coding block.

11. The computer-implemented method according to claim 10, wherein a length of a opposite sides of the subblock is shorter than a length of two opposite sides of the current coding block.

12. The computer-implemented method according to claim 1, wherein two adjacent sides of the subblock coincide with two adjacent sides of the current coding block.

13. The computer-implemented method according to claim 12, wherein a length of at least one of the two adjacent sides of the subblock is shorter than a length of the corresponding side of the current coding block.

14. The computer-implemented method according to claim 1, wherein a center of the subblock coincides with a center of the current coding block or wherein the center of the subblock does not coincide with the center of the current coding block.

15. A decoder comprising:
   one or more processors; and
   a non-transitory computer-readable storage medium coupled to the one or more processors and storing programming for execution by the one or more processors, wherein the programming, when executed by the one or more processors, configures the decoder to perform operations comprising:
      obtaining one or more parameters of a geometric merge (GEO) inter prediction mode for a current coding block;
      defining a size of a subblock that is smaller than a size of the current coding block; specifying a position of the subblock within the current coding block, so that either two or three sides of the subblock coincide with sides of the current coding block;
      determining one or more allowed split directions of a triangle partitioning mode (TPM) for the subblock depending on which of the sides of the subblock coincide with the sides of the current coding block; and
      obtaining one or more predicted samples for the current coding block by using the TPM partitioning performed for the subblock in accordance with the size of the subblock, the position of the subblock within the current coding block and a TPM split direction of the subblock.

16. The decoder according to claim 15, wherein obtaining predicted samples further comprises:
   setting weights at positions of samples belonging to a subblock area equal to a corresponding weight of the TPM partitioning specified for the subblock; and
   setting the weights at positions of samples that do not belong to a subblock area equal to a constant value V.

17. The decoder according to claim 16, wherein the constant value V depends on the coinciding sides of the current coding block and the subblock and the subblock split direction.

18. The decoder according to claim 15, wherein, after determining the one or more allowed split directions and before obtaining the one or more predicted samples, the operations further comprise selecting one of the allowed split directions a split direction for obtaining the one or more predicted samples.

19. The decoder according to claim 18, wherein the selecting comprises determining whether there is more than one allowed split direction and, if there is more than one allowed split direction, selecting one of the allowed split directions for obtaining the one or more predicted samples.

20. A non-transitory machine-readable medium having instructions stored therein, which when executed by a processor, cause the processor to perform operations, the operations comprising:
- obtaining one or more parameters of a geometric merge (GEO) inter prediction mode for a current coding block;
- defining a size of a subblock that is smaller than a size of the current coding block;
- specifying a position of the subblock within the current coding block, so that either two or three sides of the subblock coincide with sides of the current coding block;
- determining one or more allowed split directions of a triangle partitioning mode (TPM) for the subblock depending on which of the sides of the subblock coincide with the sides of the current coding block; and
- obtaining one or more predicted samples for the current coding block by using the TPM partitioning performed for the subblock in accordance with the size of the subblock, the position of the subblock within the current coding block and a TPM split direction of the subblock.

* * * * *